(12) United States Patent
Watanabe et al.

(10) Patent No.: US 8,456,726 B2
(45) Date of Patent: Jun. 4, 2013

(54) LIGHT SCANNING DEVICE, AND IMAGE FORMING APPARATUS HAVING THE SAME

(75) Inventors: Naoto Watanabe, Atsugi (JP); Toshiaki Tokita, Yamato (JP)

(73) Assignee: Ricoh Company, Ltd., Tokyo (JP)

( * ) Notice: Subject to any disclaimer, the term of this patent is extended or adjusted under 35 U.S.C. 154(b) by 139 days.

(21) Appl. No.: 13/041,762

(22) Filed: Mar. 7, 2011

(65) Prior Publication Data

US 2011/0216386 A1    Sep. 8, 2011

(30) Foreign Application Priority Data

Mar. 8, 2010    (JP) ................................. 2010-050523

(51) Int. Cl.
*G02B 26/08*    (2006.01)

(52) U.S. Cl.
USPC ...................................................... 359/204.4

(58) Field of Classification Search
USPC ............................ 359/204.3, 485, 486, 204.4
See application file for complete search history.

(56) References Cited

U.S. PATENT DOCUMENTS

| | | | |
|---|---|---|---|
| 7,245,430 B2 | 7/2007 | Kobayashi et al. | |
| 7,545,547 B2 | 6/2009 | Hayashi et al. | |
| 7,667,868 B2 | 2/2010 | Hayashi et al. | |
| 7,687,762 B2 | 3/2010 | Watanabe et al. | |
| 2006/0209168 A1* | 9/2006 | Shiraishi | 347/233 |
| 2007/0216316 A1 | 9/2007 | Hirano et al. | |
| 2008/0055672 A1 | 3/2008 | Watanabe et al. | |
| 2008/0123159 A1 | 5/2008 | Hayashi et al. | |
| 2008/0192319 A1 | 8/2008 | Miyatake et al. | |
| 2008/0204840 A1 | 8/2008 | Watanabe et al. | |
| 2008/0218827 A1 | 9/2008 | Watanabe et al. | |
| 2008/0285104 A1 | 11/2008 | Arai et al. | |
| 2009/0080907 A1 | 3/2009 | Hagiya et al. | |
| 2009/0314927 A1 | 12/2009 | Tatsuno et al. | |
| 2010/0091083 A1 | 4/2010 | Itami et al. | |
| 2010/0118366 A1 | 5/2010 | Tokita et al. | |
| 2010/0183337 A1 | 7/2010 | Kubo et al. | |
| 2010/0328417 A1 | 12/2010 | Saisho et al. | |
| 2011/0002025 A1 | 1/2011 | Tokita et al. | |

FOREIGN PATENT DOCUMENTS

| | | |
|---|---|---|
| JP | 11-202252 | 7/1999 |
| JP | 2002-23085 | 1/2002 |
| JP | 2008-70599 | 3/2008 |
| JP | 2008-257169 | 10/2008 |
| JP | 4568633 | 8/2010 |

OTHER PUBLICATIONS

U.S. Appl. No. 13/029,817, filed Feb. 17, 2011, Miyatake, et al.

* cited by examiner

*Primary Examiner* — Euncha Cherry
(74) *Attorney, Agent, or Firm* — Oblon, Spivak, McClelland, Maier & Neustadt, L.L.P.

(57) ABSTRACT

A light scanning device scanning a plurality of scanned faces by a light beam, includes a light source unit emitting a plurality of light beams including a first light beam and a second light beam having different polarization directions to each other; a beam splitter splitting each of the first light beam and the second light beam emitted from the light source unit; an incident optical system allowing each of split first light beams to be incident with an a angular difference to each other, and allowing each of split second light beams to be incident with an angular difference to each other; a deflector respectively deflecting each of the split first light beams and each of the split second light beams entered from the incident optical system; and a scanning optical system, including a polarization splitting device for splitting a plurality of the light beams deflected by the deflector based on a difference in a polarization direction, individually focusing each of the plurality of the light beams split by the polarization splitting device on a corresponding scanned face.

10 Claims, 23 Drawing Sheets

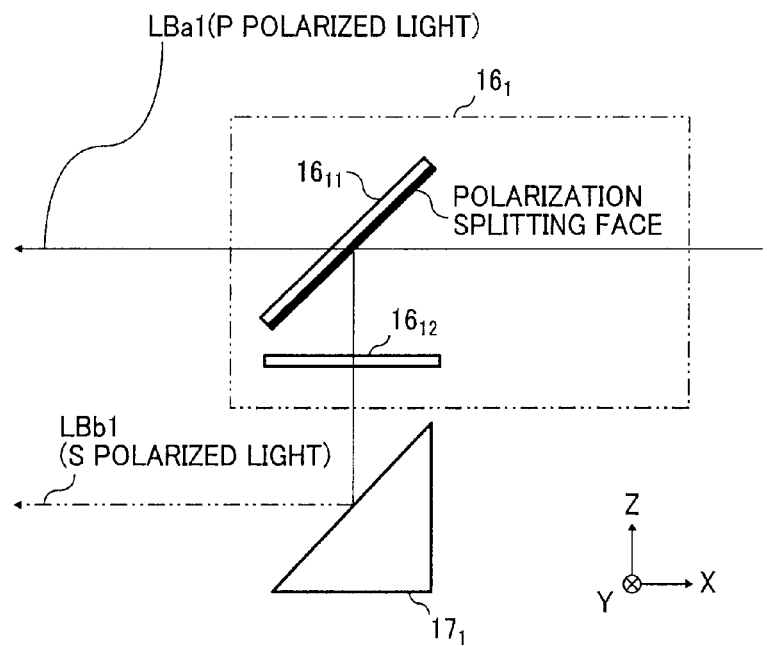
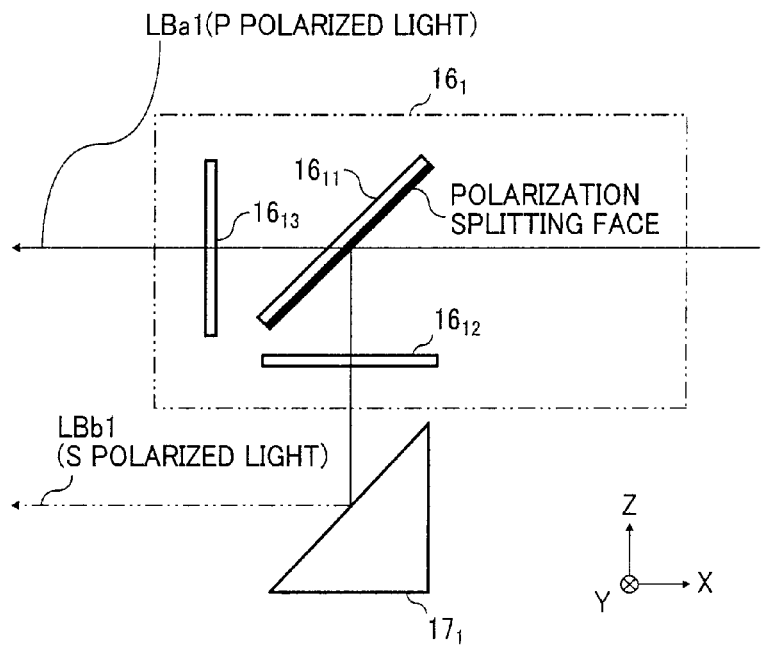

LIGHT SCANNING DEVICE, AND IMAGE FORMING APPARATUS HAVING THE SAME

CROSS-REFERENCE TO RELATED APPLICATIONS

The present application is based on and claims priority from Japanese patent application number 2010-050523, filed Mar. 8, 2010, the disclosure of which is hereby incorporated by reference herein in its entirety.

BACKGROUND

The present invention relates to a light scanning device and an image forming apparatus. And in particular, the present invention relates to a light scanning device having a polarization splitting device that splits a light beam having different polarization directions, and an image forming apparatus having the light scanning device.

For image recording using electrophotography, an image forming apparatus using a laser is widely used. In this case, the image forming apparatus has a light scanning device, and in a general image forming method the image forming apparatus uses a deflector (for example, a polygon mirror), scans a drum having photosensitivity in an axis direction of the drum by a laser beam, rotates the drum, and forms a latent image on a surface of the drum.

In recent years, in the image forming apparatus, to achieve advanced colorization and speeding up, a tandem-method image forming apparatus having a plurality of drums (normally, four drums) with photosensitivity (photosensitive bodies) has been widely used.

In the case of the tandem-method image forming apparatus, in order to perform optical writing on a plurality of photosensitive bodies by a writing unit used in the light scanning device, the number of light sources of the light scanning device is increased (for example, in the case of four photosensitive bodies, normally four light sources are needed.). Therefore, problems such as an increase in the number of components, an increase in cost, and so on occur.

There is an example of a light scanning device used in the tandem-method image forming apparatus does not require an increased number of light sources (see Japanese patent application publication number 2002-23085). In Japanese patent application publication number 2002-23085, a pyramidal mirror, or a plate mirror is used, and a light beam from a common light source scans different scanned faces. In this method, the number of light sources can be reduced, however the number of deflecting mirrors is two at a maximum, and there still is a problem of speeding up.

In order to solve the above problem, a light scanning device has been proposed that scans two different scanned faces by splitting one light beam from a light source into two light beams shifted in a sub-scanning direction by a light beam splitter, and scanning is performed by a deflector that coaxially rotates two polygon mirrors which are shifted at angles to each other and overlapped (see Japanese patent number 4568633).

In the technique disclosed in Japanese patent number 4568633, the two polygon mirrors of which a phase is shifted and overlapped are used as a scanner that scans different scanned faces by a light beam from a common light source, however the polygon mirrors of which the phase is shifted are not a general-purpose product, and therefore there is a possibility of an increase in cost. In addition, processing of the polygon mirrors is needed, and a face tangle error of each of the polygon mirrors is different and a surface accuracy is different, and therefore there is a possibility of a deterioration in image quality.

Additionally, a light scanning device that splits one light beam from a light source into two light beams having a main scanning direction by a light beam splitter, allows the two split light beams to enter a deflector having four reflecting faces with an aperture angle $\lambda/2$ via an incident mirror, and scans different scanned faces has been proposed (see Japanese patent application publication number 2008-257169).

In addition, as for the tandem-method image forming apparatus, when increasing the number of drums, there is a tendency for the image forming apparatus to increase in size, and therefore, including a light scanning device, downsizing has been demanded. For the purpose of downsizing, it is effective to overlap a plurality of optical paths of scanning light travelling toward each drum from a deflector.

For example, Japanese patent application publication number 2008-70599 discloses a light scanning device having a light source section that emits a plurality of light beams having different polarization directions, a single light deflector that deflects and scans the plurality of light beams emitted from the light source section in a main scanning direction, a scanning and focusing section that focuses each of the plurality of light beams on each of a plurality of corresponding scanned faces, and an optical element that is an optical path diverging section which is provided on an optical path between the light deflector and the scanned faces, and diverges optical paths of the plurality of light beams based on the polarization directions of the light beams, and on which a concave-convex configuration part having a pitch which is equivalent to, or less than or equal to a wavelength of the light beams is formed.

In the light scanning device disclosed in Japanese patent application publication number 2008-257169, in order to split the plurality of light beams toward the plurality of scanned faces, it is necessary to split the plurality of light beams so as to be at a distance from each other.

And in order to do so, there is a method such that the plurality of light beams are incident obliquely at a different angle to each other to a rotation axis of the deflector and the light beams reflected by the deflector are split by a splitting mirror to a predetermined distance. However, in the case of using this method, a light beam is incident obliquely on a scanning lens, and therefore, there is a possibility of deteriorating an optical characteristic such as bending of a scanning line and so on.

As another method, there is a method such that the plurality of light beams are incident vertically to the rotation axis of the deflector, and the plurality of light beams are separated on the deflector, and then the light beams are split by the splitting mirror. In the case of using this method, it is necessary to make the deflector larger in order that the plurality of light beams are separated and incident on the deflector, and therefore the cost of the deflector is increased.

Any of the above methods need a space to split the plurality of light beams, and therefore the light scanning device becomes large.

In the light scanning device disclosed in Japanese patent application publication number 2008-70599, the number of light sources are not reduced, and therefore it is not possible to reduce the cost of the light source section.

SUMMARY

An object of the present invention is to provide a light scanning device that is low-cost and small and forms a high-quality image, and an image forming apparatus having the light scanning device.

In order to achieve the above object, an embodiment of the present invention provides: A light scanning device which scans a plurality of scanned faces by a light beam, comprising: a light source unit which emits a plurality of light beams including a first light beam and a second light beam having different polarization directions to each other; a beam splitter which splits each of the first light beam and the second light beam emitted from the light source unit; an incident optical system which allows each of split first light beams to be incident with an angular difference to each other, and allows each of split second light beams to be incident with an angular difference to each other; a deflector which respectively deflects each of the split first light beams and each of the split second light beams entered from the incident optical system; and a scanning optical system, including a polarization splitting device for splitting a plurality of the light beams deflected by the deflector based on a difference in a polarization direction, which individually focuses each of the plurality of the light beams split by the polarization splitting device on a corresponding scanned face.

BRIEF DESCRIPTION OF THE DRAWINGS

FIG. 11A is a polarization splitting face seen from the top, and FIG. 11B is the polarization splitting face seen from the side, and FIG. 11C is a cross-sectional diagram of the polarization splitting element $16_{11}$($16_{21}$) along a line A-A of FIG. 11A.

FIGS. 11A' to 11C' are schematic diagrams illustrating another example of a constitution of a polarization splitting element $16_{11}$ ($16_{21}$) and FIG. 11A' is a polarization splitting face seen from the above, and FIG. 11B' is the polarization splitting face seen from the side, and FIG. 11C' is a cross-sectional diagram of the polarization splitting element $16_{11}$ ($16_{21}$) along a line A-A of FIG. 11A'.

FIG. 14 is a schematic diagram illustrating an example of polarization splitting and a function of a reflecting mirror $17_1$ in the polarization splitting device $16_1$.

FIG. 15 is a schematic diagram illustrating another example of polarization splitting and the function of the reflecting mirror $17_1$ in the polarization splitting device $16_1$ ($16_2$).

DETAILED DESCRIPTION OF THE PREFERRED EMBODIMENTS

Hereinafter, embodiments of the present invention will be explained in detail based on FIGS. 1 to 34.

Figure 1:
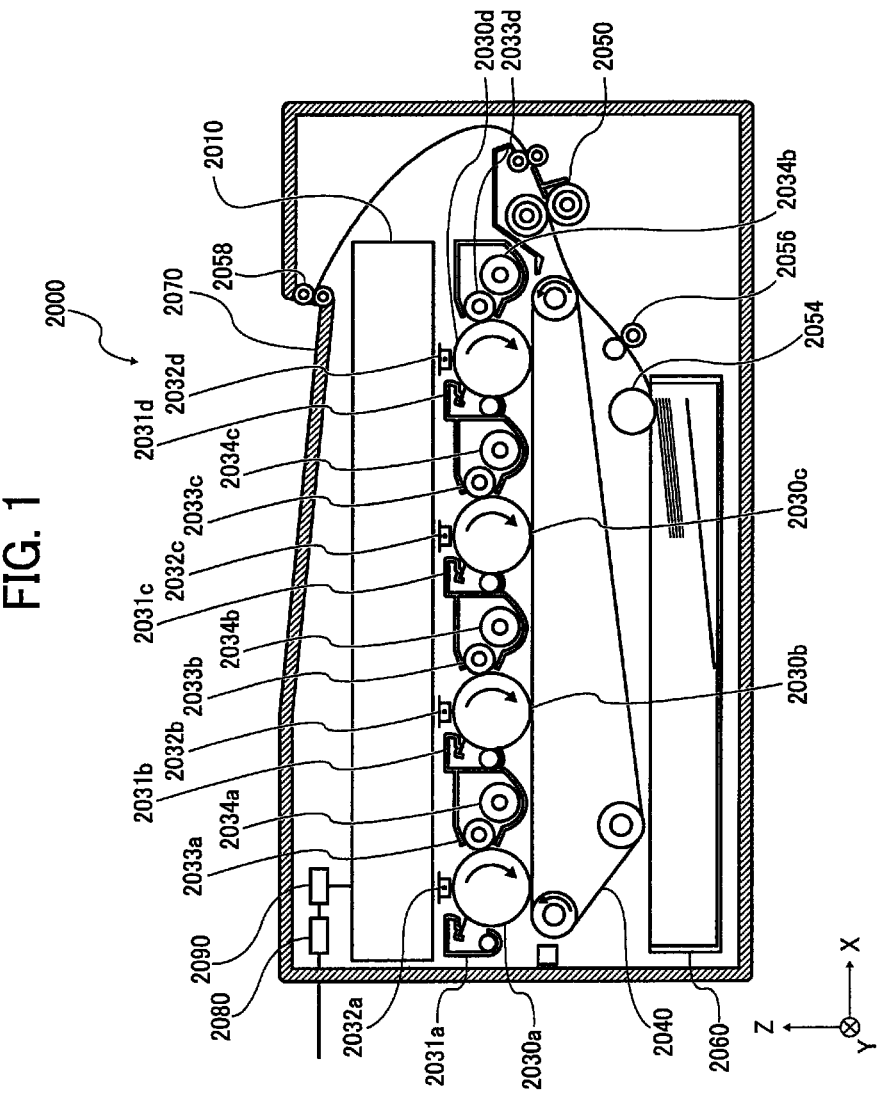
FIG. 1 is a schematic diagram illustrating a constitution of a color printer 2000 as an imaging forming apparatus according to an embodiment of the present invention.

In FIG. 1, a schematic constitution of a color printer 2000 as an image forming apparatus according to an embodiment of the present invention is illustrated.

The color printer 2000 is a tandem-method multi-color printer that overlaps four colors (cyan, magenta, yellow, and black) and forms full color images. The color printer 2000 includes a light scanning device 2010, four photosensitive drums 2030 (2030a, 2030b, 2030c, 2030d), four cleaning units 2031 (2031a, 2031b, 2031c, 2031d), four chargers 2032 (2032a, 2032b, 2032c, 2032d), four developing rollers 2033 (2033a, 2033b, 2033c, 2033d), four toner cartridges 2034 (2034a, 2034b, 2034c, 2034d), a transfer belt 2040, a fuser roller 2050, a paper feeding roller 2054, a pair of resist rollers 2056, a paper ejecting roller 2058, a paper feed tray 2060, a paper receiving tray 2070, a communication control device 2080, and a printer control device 2090 that controls each of the above overall.

The communication control device 2080 controls a two-way communication between a higher-level device (for example, a personal computer) via a network.

The photosensitive drum 2030a, the charger 2032a, the developing roller 2033a, the toner cartridge 2034a, and the cleaning unit 2031a are used as a group, and constitute an image forming station that forms a black image (hereinafter, referred to as a K station).

The photosensitive drum 2030b, the charger 2032b, the developing roller 2033b, the toner cartridge 2034b, and the cleaning unit 2031b are used as a group, and constitute an image forming station that forms a cyan image (hereinafter, referred to as a C station).

The photosensitive drum 2030c, the charger 2032c, the developing roller 2033c, the toner cartridge 2034c, and the cleaning unit 2031c are used as a group, and constitute an image forming station that forms a magenta image (hereinafter, referred to as a M station).

The photosensitive drum 2030d, the charger 2032d, the developing roller 2033d, the toner cartridge 2034d, and the cleaning unit 2031d are used as a group, and constitute an image forming station that forms a yellow image (hereinafter, referred to as a Y station).

A photosensitive layer is formed on each surface of the photosensitive drums 2030 (2030a, 2030b, 2030c, 2030d). That is, each surface of the photosensitive drums is a scanned face. Each photosensitive drum rotates in an arrow direction in FIG. 1 by a rotating mechanism (not illustrated). In this specification, a direction along a longitudinal direction (axis direction) of each photosensitive drum is defined as a Y-axis direction, and a direction along an arrangement direction of the four photosensitive drums is defined as an X-axis direction, in an X-Y-Z three-dimensional Cartesian coordinate system. As illustrated in FIG. 1, a direction perpendicular to a paper surface is defined as a Y-axis direction (a longitudinal direction of the photosensitive drums), a horizontal direction is defined as an X-axis direction (an arrangement direction of the photosensitive drums), and a vertical direction is defined as a Z-axis direction (a direction perpendicular to an X-Y plane).

Each of the chargers 2032 (2032a, 2032b, 2032c, 2032d) evenly charges each surface of corresponding photosensitive drums, respectively.

The light scanning device 2010 illuminates each surface of corresponding charged photosensitive drums 2030 (2030a, 2030b, 2030c, 2030d) with each light beam which is modulated per color based on multi-color image information (black image information, cyan image information, magenta image information, and yellow image information) from the higher-level device. Therefore, on each surface of the corresponding charged photosensitive drums 2030 (2030a, 2030b, 2030c, 2030d), an electrical charge is lost only in an illuminated part, and a latent image corresponding to each image information is formed on each surface of the photosensitive drums 2030 (2030a, 2030b, 2030c, 2030d). The latent image formed here moves toward each of corresponding developing rollers 2033 (2033a, 2033b, 2033c, 2033d) with a rotation of each of the photosensitive drums 2030 (2030a, 2030b, 2030c, 2030d). A constitution of the light scanning device will be explained later.

The toner cartridge 2034a stores a black toner, and the black toner is supplied to the developing roller 2033a. The toner cartridge 2034b stores a cyan toner, and the cyan toner is supplied to the developing roller 2033b. The toner cartridge 2034c stores a magenta toner, and the magenta toner is supplied to the developing roller 2033c. The toner cartridge 2034d stores a yellow toner, and the yellow toner is supplied to the developing roller 2033d.

Each of the toners corresponding to each of the toner cartridges 2034 (2034a, 2034b, 2034c, 2034d) is applied thinly and evenly on each surface of the developing rollers 2033 (2033a, 2033b, 2033c, 2033d) in accordance with its rotation. And when the toners on each surface of the developing rollers 2033 (2033a, 2033b, 2033c, 2033d) contact each surface of the corresponding photosensitive drums 2030 (2030a, 2030b, 2030c, 2030d), the toners move and adhere to the illuminated part of each surface of the photosensitive drums 2030 (2030a, 2030b, 2030c, 2030d). That is, each of the developing rollers 2033 (2033a, 2300b, 2300c, 2033d) applies the toners on each latent image formed on each of the corresponding photosensitive drums 2030 (2030a, 2030b, 2030c, 2030d) to form each image. Here, an image formed by each of the applied toners (hereinafter, referred to as a toner image) moves toward the transfer belt 2040 with the rotation of each of the photosensitive drums 2030 (2030a, 2030b, 2030c, 2030d).

Each toner image of black, cyan, magenta, and yellow transfers sequentially per color on the transfer belt 2040 from each surface of the photosensitive drums 2030 (2030a, 2030b, 2030c, 2030d) at a predetermined timing, and each toner image is overlapped on the transfer belt 2040, and then a color image is formed.

The paper feed tray 2060 stores papers for recording. In the vicinity of the paper feed tray 2060, the paper feeding roller 2054 is arranged. The paper feeding roller 2054 takes out a sheet of paper from the paper feed tray 2060 and feeds the paper to the pair of resist rollers 2056. The pair of resist rollers 2056 sends the paper at a predetermined timing to the transfer belt 2040. And therefore, the color image on the transfer belt 2040 is transferred to the paper. The paper on which the color image has been transferred here is sent to the fuser roller 2050.

The fuser roller 2050 applies heat and pressure on the paper, and therefore toners of the color image are fixed on the paper. The paper on which the toners have been fixed is sent to the paper receiving tray 2070 via the paper ejecting roller 2058 and sequentially stacked on the paper receiving tray 2070.

Each of the cleaning units 2031 (2031a, 2031b, 2031c, 2031d) removes remaining toners on each surface of the corresponding photosensitive drums 2030 (2030a, 2030b, 2030c, 2030d) after transferring to the transfer belt 2040. Each surface of the photosensitive drums 2030 (2030a, 2030b, 2030c, 2030d) where the remaining toners have been removed returns to a position facing the corresponding chargers 2032 (2032a, 2032b, 2032c, 2032d) again.

A sequence of an image forming process is finished as described above, and image forming on a plurality of papers for recording is performed by repeating the above.

Next, a constitution of the light scanning device 2010 will be explained in detail.

First Embodiment

Figure 2:
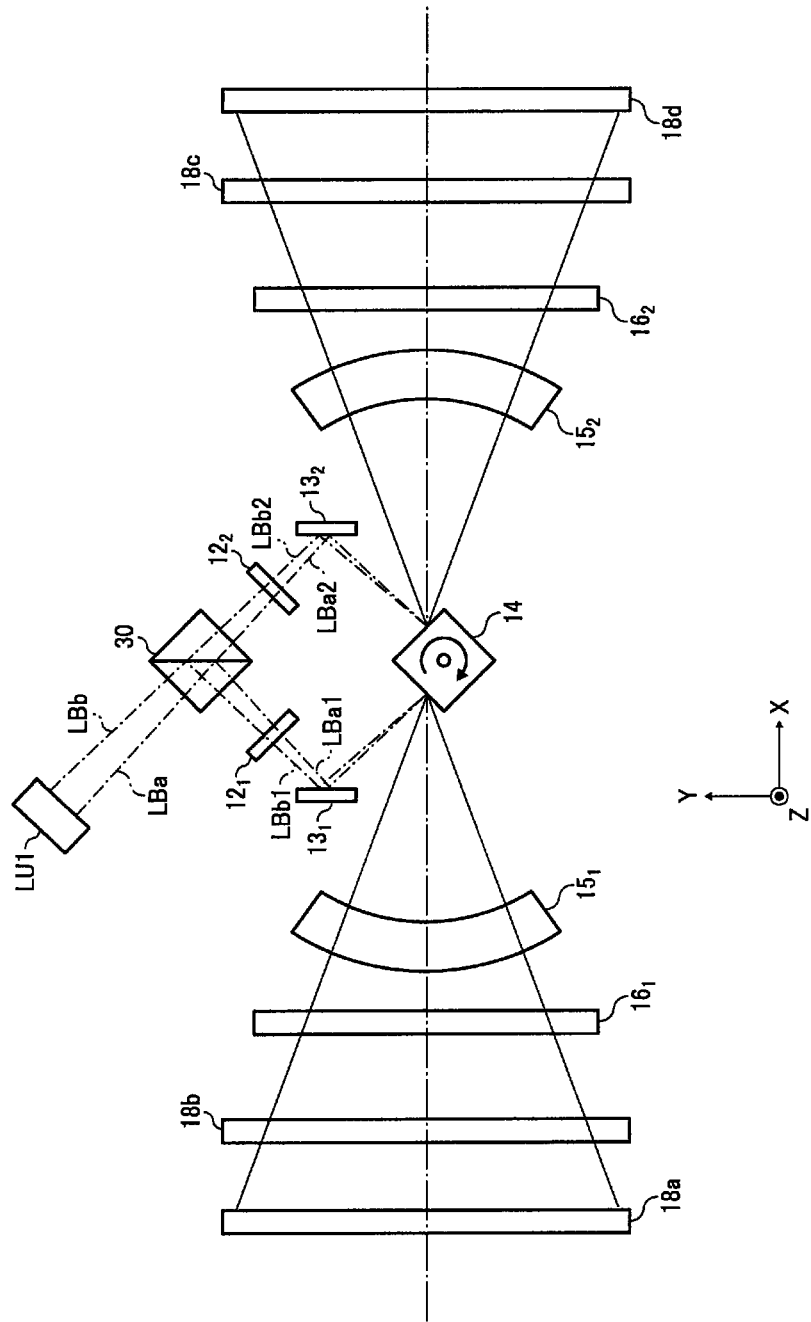
FIG. 2 is a schematic top view illustrating a constitution of a light scanning device according to a first embodiment of the present invention.
Figure 3:
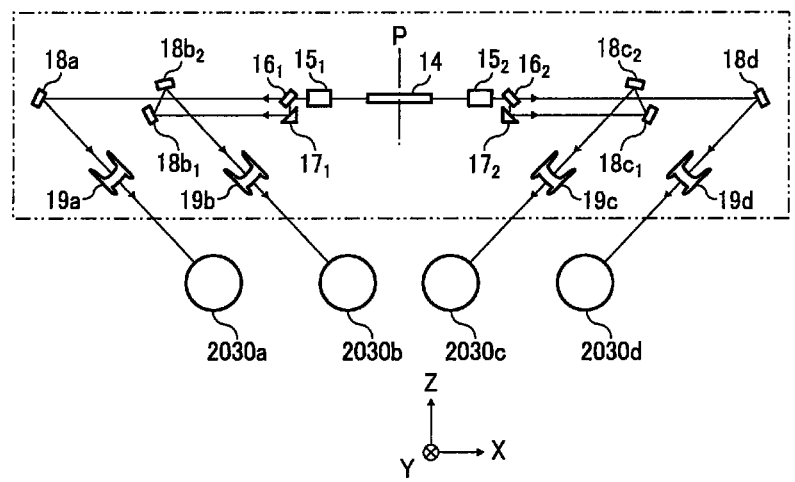
FIG. 3 is a schematic front view illustrating the constitution of the light scanning device according to the first embodiment of the present invention.

FIG. 2 is a schematic top view of a light scanning device according to a first embodiment of the present invention, and FIG. 3 is a schematic front view of the light scanning device according to the first embodiment of the present invention.

The light scanning device 2010, as described in FIGS. 2 and 3, has a light source unit (LU1), two cylindrical lenses ($12_1$, $12_2$), a polygon mirror (deflector) 14, two fθ lenses ($15_1$, $15_2$), two polarization splitting devices (polarization splitting devices) ($16_1$, $16_2$), two reflecting mirrors ($17_1$, $17_2$), a plurality of bending-back mirrors (18a, $18b_1$, $18b_2$, $18c_1$, $18c_2$, 18d), four anamorphic lenses (19a, 19b, 19c, 19d), and a scanning control device (not illustrated).

Figure 4:
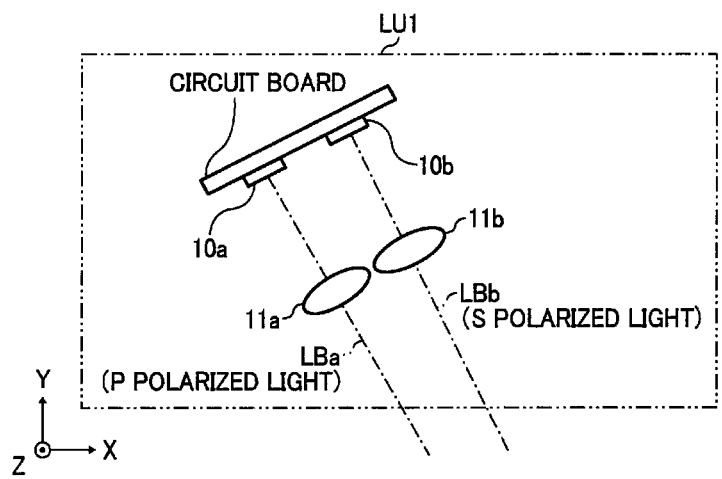
FIG. 4 is a schematic diagram illustrating a constitution of a light source unit LU1 of the light scanning device according to the first embodiment of the present invention.
Figure 5:
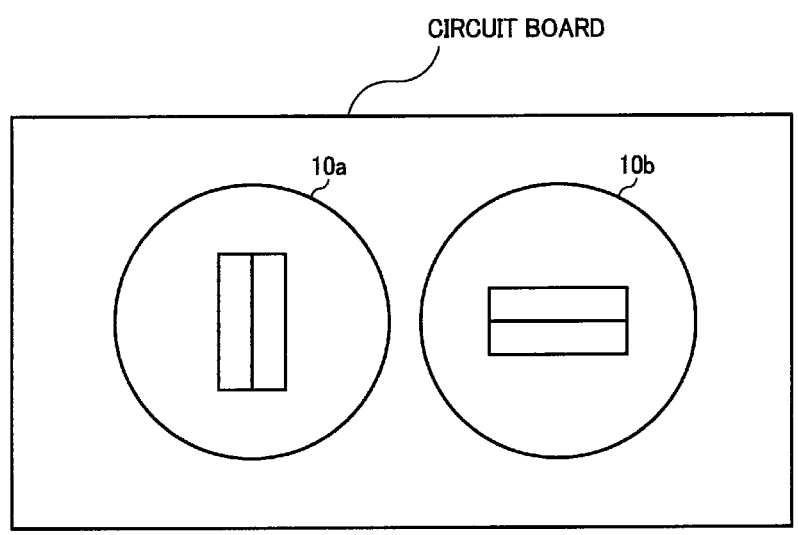
FIG. 5 is a schematic diagram illustrating an example of an arrangement of two light sources $10a$ and $10b$ illustrated in FIG. 4.
Figure 6:
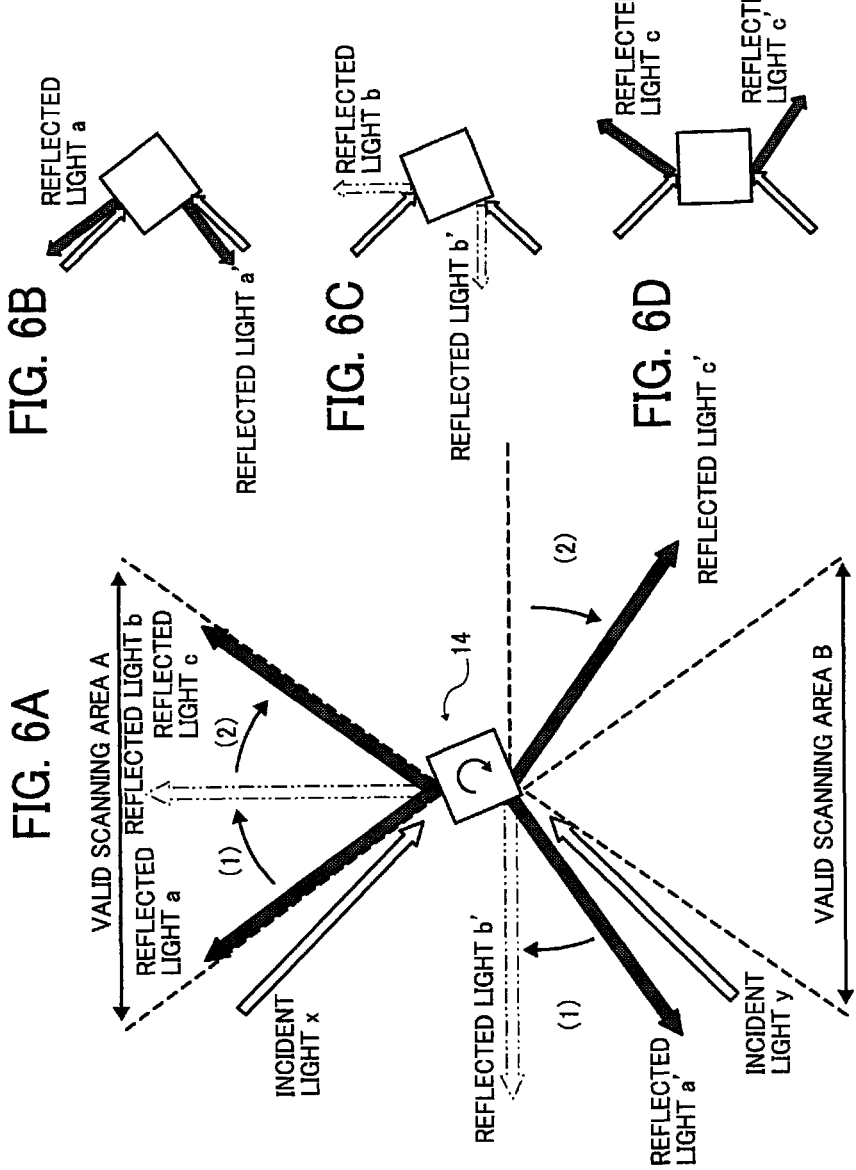
FIG. 6A to 6D are diagrams explaining light scanning by split light beams.

FIG. 4 is a schematic diagram illustrating a constitution of the light source unit LU1 according to the first embodiment of the present invention. FIG. 5 is a schematic diagram illustrating an example of an arrangement of two light sources 10a and 10b.

The light source unit LU1, as illustrated in FIG. 4 as an example, has the two light sources 10a and 10b, and two collimating lenses 11a and 11b.

The light source 10a and the light source 10b are equal light sources. And the light source 10a and the light source 10b are arranged on a circuit board such that polarization directions of the emitted light are orthogonal to each other. That is, as illustrated in FIG. 5, the two light sources 10a and 10b are mounted on the circuit board such that one light source is rotated 90 degrees with respect to the other light source. Here, a P polarized light (first light beam) is emitted from the light source 10a, and an S polarized light (second light beam) is emitted from the light source 10b.

The collimating lens 11a is arranged on an optical path of a light beam LBa from the light source 10a, and allows the light beam LBa to be approximately parallel light.

The collimating lens 11b is arranged on an optical path of a light beam LBb from the light source 10b, and allows the light beam LBb to be approximately parallel light.

As illustrated in FIG. 2, the approximately parallel light LBa is split into reflected light LBa1 and transmitted light LBa2 by a beam splitter 30 as a light beam splitter.

The approximately parallel light LBb is split into reflected light LBb1 and transmitted light LBb2 by the beam splitter 30 as the light beam splitter.

The light beams LBa1, LBa2, LBb1, and LBb2 split by the beam splitter 30 are all on the same plane, and perpendicular to a rotation axis of the polygon mirror.

The cylindrical lens $12_1$ focuses the light beam LBa1 and the light beam LBb1 on approximately a deflecting reflection face of the polygon mirror 14 via an incident mirror $13_1$ with respect to the Z-axis direction.

The cylindrical lens $12_2$ focuses the light beam LBa2 and the light beam LBb2 on approximately a deflecting reflection face of the polygon mirror 14 via an incident mirror $13_2$ with respect to the Z-axis direction.

The light beam LBa1 and the light beam LBb1 are incident on the polygon mirror 14 with an appropriately $\lambda/2$ angular difference to each other.

The light beam LBa2 and the light beam LBb2 are incident on the polygon mirror 14 with an appropriately $\lambda/2$ angular difference to each other.

The light beams LBa1, LBa2, LBb1, and LBb2 split by the beam splitter 30 are incident on the polygon mirror 14 by the cylindrical lens $12_1$, the cylindrical lens $12_2$, the incident mirror $13_1$, and the incident mirror $13_2$ constituting an incident optical system such that the light beam LBa1 and the light beam LBb1 have the approximately $\lambda/2$ angular difference to each other, and the light beam LBa2 and the light beam LBb2 have the approximately $\lambda/2$ angular difference to each other.

Since all the light beams LBa1, LBa2, LBb1, and LBb2 are horizontally incident on the polygon mirror 14, and overlap in the sub-scanning direction and are incident, it is possible to thin a reflection face of the polygon mirror 14 in the sub-scanning direction.

Therefore, it is not only possible to reduce the cost of the polygon mirror, but also possible to prevent optical characteristics from deteriorating such as bending of a scanning line and so on compared to an oblique incident.

FIGS. 6A, 6B, 6C, 6D are diagrams explaining light scanning by split light.

As illustrated in FIG. 6A, a light beam emitted from the light source 10a or the light source 10b is once split into two light beams, and the two light beams (incident light x and incident light y) are incident on a different face of the deflector 14, and have a $\lambda/2$ angular difference to each other. Since there is an approximately $\lambda/2$ angular difference to each other, split light beams do not scan valid scanning areas A and B at the same time.

As an example, reflected light in the case of scanning a valid scanning area A illustrated in FIG. 6A (in the case of scanning in order of reflected light a, reflected light b, and reflected light c) will be explained by use of FIGS. 6B, 6C, and 6D.

Since an angular difference between the incident light x and the incident light y is $\lambda/2$, when reflected light of the incident light x becomes the reflected light a, as illustrated in FIG. 6B, reflected light a' which is reflected light of the incident light y does not enter a valid scanning area B. When the deflector 14 rotates and reflected light of the incident light x becomes the reflected light b, as illustrated in FIG. 6C, reflected light of the incident light y becomes reflected light b' and does not enter the valid scanning area B (see (1) in FIG. 6A). And when the deflector 14 further rotates and reflected light of the incident light x becomes reflected light c, as illustrated in FIG. 6D, reflected light of the incident light y becomes reflected light c' and does not enter the valid scanning area B (see (2) in FIG. 6A).

The reflected light a', b' and c' do not enter the valid scanning area B.

This is because the angular difference between the incident light x and the incident light y $\lambda/2$, and the number of faces of the deflector 14 is four. Therefore, an angular difference of the reflected light is always $\lambda/2$, and the valid scanning area A and the valid scanning area B are not scanned at the same time.

In the case where the incident light x scans the valid scanning area A, the incident light y scans outside the valid scanning area B and does not scan a scanned face of the photosensitive body 2030; however it is not necessary that the angular difference between the incident light x and the incident light y be exactly λ/2, and there is no problem with having a slight difference. (this is clear from the up-down symmetry of the explanatory diagram illustrated in FIG. 6A.)

And in the case where the incident light y scans the valid scanning area B, the incident light x scans outside the valid scanning area A; therefore it is also clear from the symmetry of the constitution of the light scanning device that the incident light x does not scan a scanned face of the photosensitive body 2030.

A light source (10a or 10b) modulation drive is performed based on image information of a corresponding color (for example, black), in the case where the incident light x scans inside the valid scanning area A.

In addition, in the case where the incident light y scans inside the valid scanning area B, the light source (10a or 10b) modulation drive is performed based on image information of a corresponding color (for example, yellow). Therefore, the light source 10a or the light source 10b are both capable of scanning an image of two colors, thus decreasing by half the cost of the light source.

Figure 7:
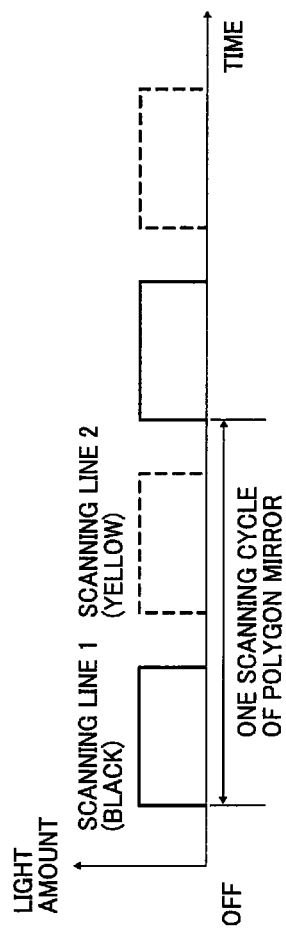
FIG. 7 is a timing diagram of exposure for a plurality of colors.

FIG. 7 is a timing diagram of exposure for a plurality of colors. In particular, in the case where exposure for black and exposure for yellow are performed by each light beam emitted by either the light source 10a or the light source 10b and passing through the valid scanning areas A and B, the timing diagram of light emission of the light source is illustrated. In FIG. 7, a vertical axis expresses a light amount, and a horizontal axis expresses time. A solid line expresses a part corresponding to black; a dot-line expresses a part corresponding to yellow. A light receiver is equipped outside the valid scanning areas A and B, and a timing that starts the exposure for black and the exposure for yellow is determined by detecting a scanning beam that has scanned outside the valid scanning areas A and B by the light receiver. The light receiver is not illustrated; however a photodiode is normally used.

Figure 8:
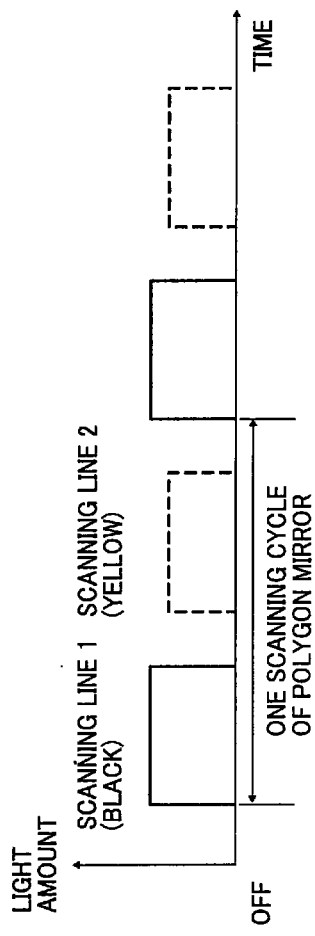
FIG. 8 is a timing diagram of the exposure for the plurality of colors in the case of changing a light emission amount of the light source per color.

FIG. 8 is a timing diagram of changing a light emission amount of the light source per color.

In FIG. 7, the light emission amount of the light source is set the same for the exposure for black and the exposure for yellow; however, practically a transmission rate and a reflection rate of each optical element are relatively different in exposure for black and exposure for yellow. Therefore, if the light emission amount of the light source is set the same for the exposure for black and the exposure for yellow, a light amount of illumination light reaching the photosensitive body 2030 is different. Accordingly, in order to equalize the light amount of illumination light reaching a scanned face of the photosensitive body 2030a for black and the light amount of illumination light reaching a scanned face of the photosensitive body 2030d, as illustrated in FIG. 8, the light amount of the light source is changed for the exposure for black and the exposure for yellow.

The polygon mirror 14 has a four-face mirror including four reflection faces respectively parallel to the Z axis, and each face is a deflecting reflection face.

The polygon mirror 14 rotates at a constant speed around a shaft parallel to the Z-axis direction, and deflects a light beam from each of the cylindrical lenses 12₁ and 12₂ in a plane parallel to an X-Y plane at constant angular velocity.

Here, a light beam from the cylindrical lens 12₁ is deflected to a −X side of the polygon mirror 12, and a light beam from the cylindrical lens 12₂ is deflected to a +X side of the polygon mirror 14.

A plane that is gradually formed by the light beam deflected by the deflecting reflection face of the polygon mirror 14 is called "a deflection plane" (see Japanese patent application publication number H11-202252). Here, the deflection plane is parallel to the X-Y plane.

Figure 9:
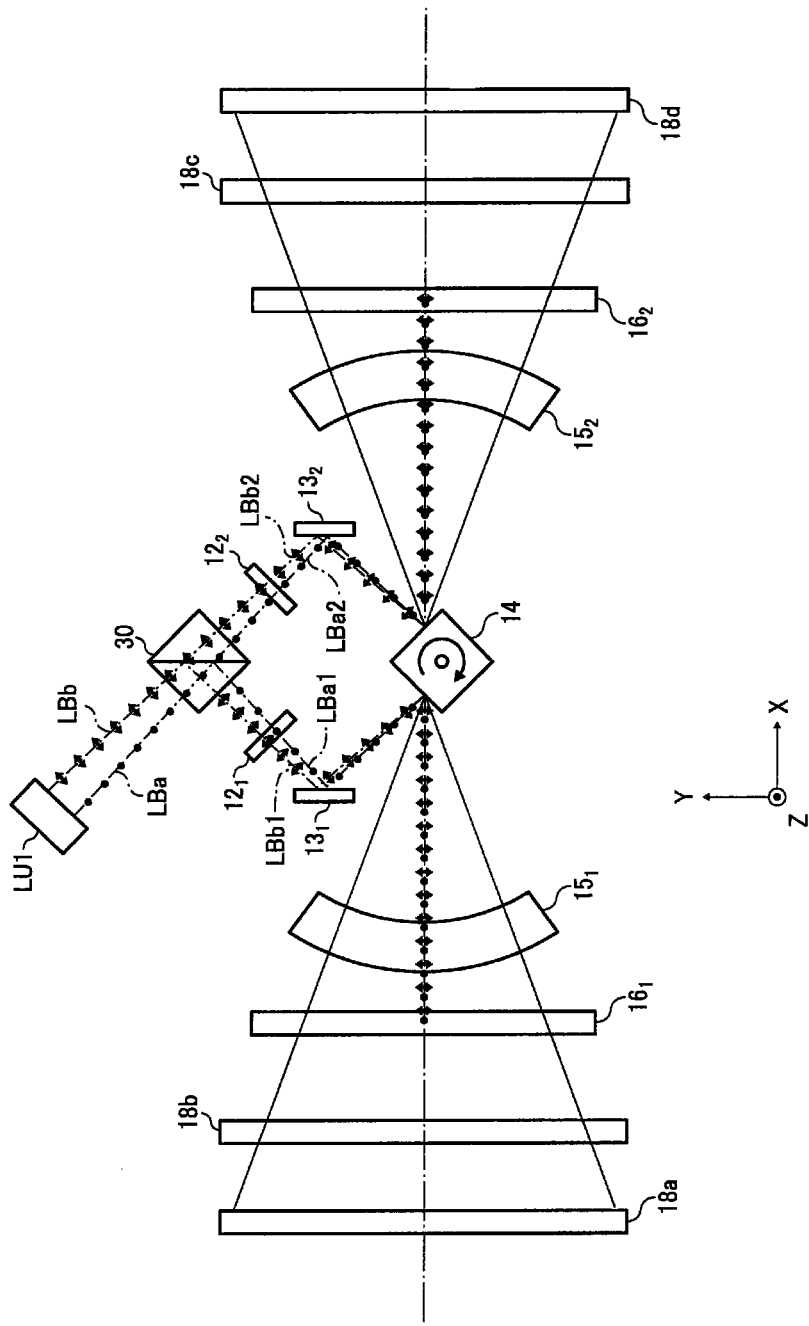
FIG. 9 is an explanatory diagram explaining a polarization state of each light beam of the light scanning device according to the first embodiment of the present invention.

FIG. 9 is an explanatory diagram showing a polarization state of each light beam of the light scanning device according to the first embodiment of the present invention.

Here, the polarization state of each light beam will be explained by use of FIG. 9.

The light beam LBa emitted from the light source 10a is the P polarized light to a splitting face of the beam splitter 30, and split into a light beam LBa1 and a light beam LBa2 by the beam splitter 30.

The light beam LBb emitted from the light source 10b is the S polarized light to the splitting face of the beam splitter 30, and split into a light beam LBb1 and a light beam LBb2 by the beam splitter 30.

The beam splitter 30 has equal transmission rate and reflection rate with respect to the P polarized light and the S polarized light that are incident, and reflects and transmits the incident light in a state of maintaining its phase at the time of incidence.

Therefore, the light beam LBa1 and the light beam LBa2 are reflected and transmitted in a state of the same polarization state (P polarized light) as the polarization state of the light beam (incident light) LBa, and the light beam LBb1 and the light beam LBb2 are reflected and transmitted in a state of the same polarization state (S polarized light) as the polarization state of the light beam (incident light) LBb.

The light beams LBa1 and LBb1 split by the beam splitter 30 travelling toward the −X side via the cylindrical lens 12₁ and the incident mirror 13₁ are scanned by the deflector 14, and travel toward the −X side. The light beams LBa1 and LBb1 travelling toward the −X side are the P polarized light, and the S polarized light, respectively.

The light beams LBa2 and LBb2 split by the beam splitter 30 travelling toward the +X side via the cylindrical lens 12₂ and the incident mirror 13₂ are scanned by the deflector 14, and travel toward the +X side. The light beams LBa2 and LBb2 travelling toward the +X side are the P polarized light, and the S polarized light, respectively.

The fθ lens 15₁ is arranged on the −X side of the polygon mirror 14, and on an optical path of a light beam from the cylindrical lens 12₁ deflected by the polygon mirror 14.

Figure 10:
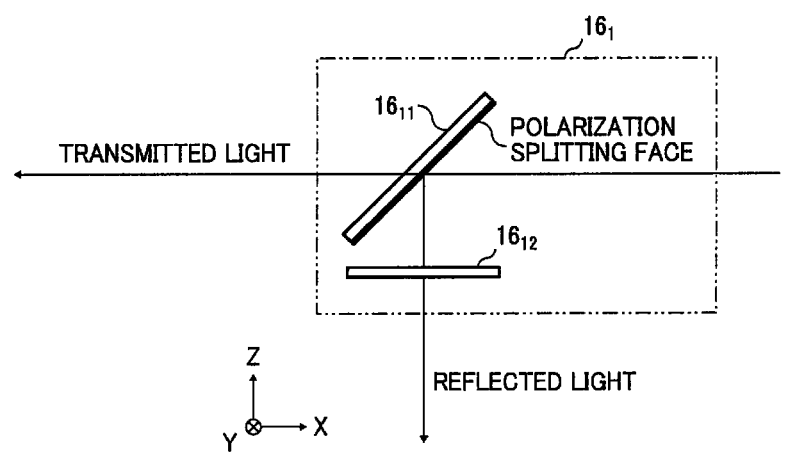
FIG. 10 is a schematic diagram illustrating an example of a constitution of a polarization splitting device $16_1$.

FIG. 10 is a schematic diagram illustrating an example of a constitution of a polarization splitting device 16₁.

The polarization splitting device 16₁, as illustrated in FIG. 10, includes a polarization splitting element 16₁₁, and a polarizer 16₁₂ that is arranged on a −Z side of the polarization splitting element 16₁₁.

Figure 11A:
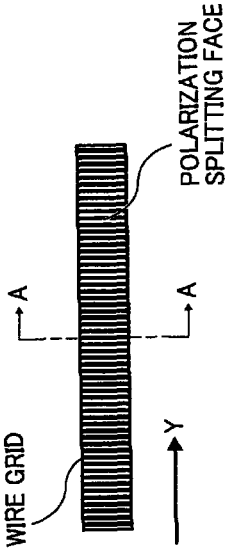
FIGS. 11A to 11C are schematic diagrams illustrating an example of a constitution of a polarization splitting element $16_{11}$ ($16_{21}$)
Figure 11B:
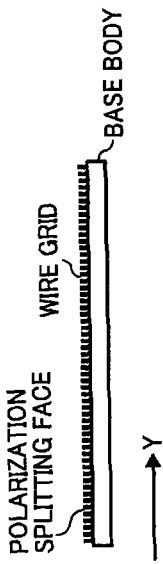
Figure 11C:
Figure 11A:
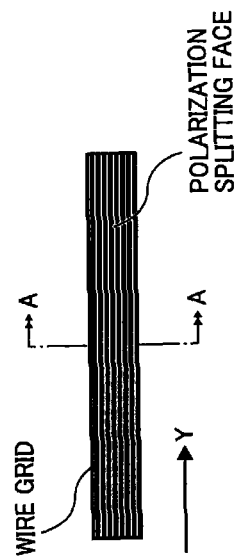
Figure 11B:
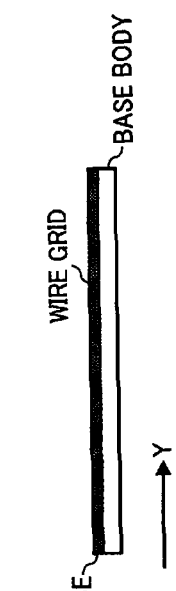
Figure 11C:

The polarization splitting element 16₁₁, as illustrated in FIGS. 11A, 11B, and 11C as an example, is a wire grid polarization splitting element, and on a plate-like base body a wire grid is formed as a microstructure grid where a grid pitch is smaller than a wavelength of the incident light.

FIG. 11A is a schematic diagram illustrating a constitution of a polarization splitting face seen from the top, and FIG. 11B is a schematic diagram illustrating a constitution of the polarization splitting face seen from the side (Z-X cross-sectional diagram), and FIG. 11C is a cross-sectional diagram along a line A-A of FIG. 11A.

And as another example, as illustrated in FIGS. 11A', 11B' and 11C', the polarization splitting face can be formed such that the wire grid rotates by 90 degrees compared to FIGS. 11A, 11B, and 11C. The polarization direction of transmitted light and the polarization direction of reflected light are switched; however, the polarization splitting device has the same function.

Here, the following embodiment is described in the case of a constitution example of FIGS. 11A, 11B, and 11C.

The polarization splitting device can be a dielectric multilayer film; however, using the wire grid is higher in usage efficiency and splitting performance.

Figure 12:
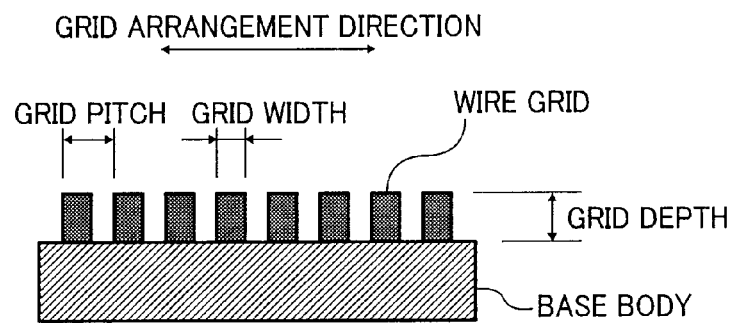
FIG. 12 is a schematic diagram illustrating an example of a grid arrangement (a grid pitch and a grid depth) of the polarization splitting element $16_{11}$($16_{21}$).

Here, as an example, the grid pitch of the wire grid is 0.15 μm, and a duty ratio as "grid width/grid pitch" is 50%, and a grid depth is 0.05 μm (see FIG. 12). Material of the wire is aluminum. And as the base body, a transparent material such as glass, hard plastic, and so on can be used. Here, FIG. 12 is a schematic diagram illustrating an example of a grid arrangement (grid pitch and grid depth) of the polarization splitting element $16_{11}$ ($16_{21}$).

Figure 13:
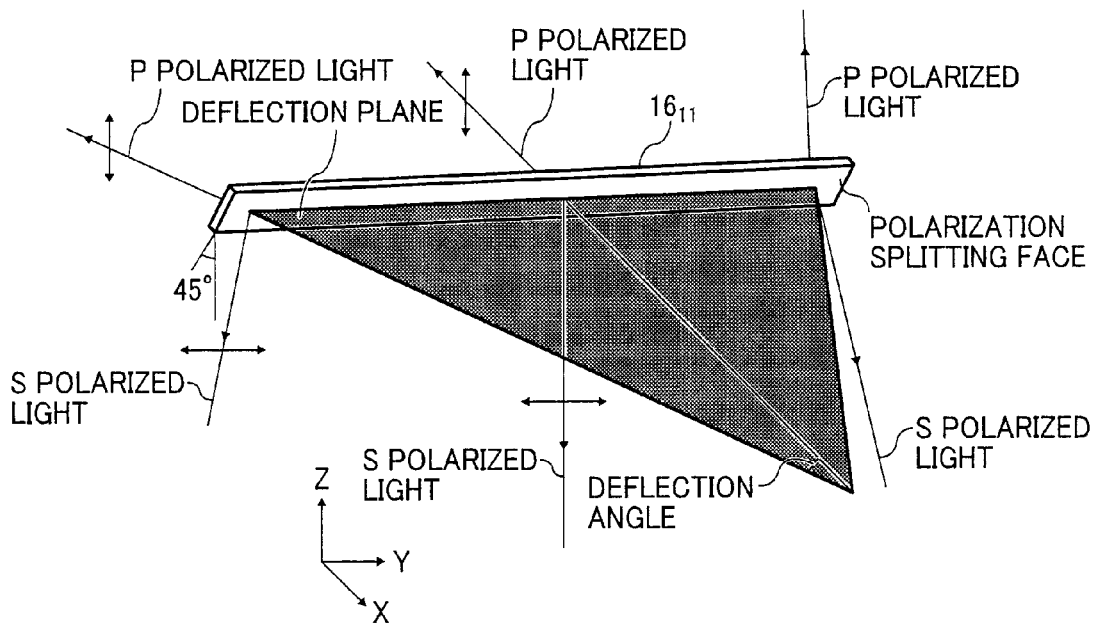
FIG. 13 is a schematic diagram illustrating transmission of P polarized light and reflection of S polarized light on the polarization splitting face of the polarization splitting element $16_{11}$($16_{21}$).

A face of the polarization splitting element $16_{11}$ where the wire grid is formed is a polarization splitting face, and the polarization splitting element $16_{11}$ transmits the P polarized light and reflects the S polarized light (see FIG. 13). If a component of the S polarized light is included in the incident light beam LBa1 on the polarization splitting element $16_{11}$, and a component of the P polarized light is included in the incident light beam LBb1 on the polarization splitting element $16_{11}$, unintended reflection and transmission occur and the splitting performance is deteriorated. Here, FIG. 13 is a schematic diagram illustrating the transmission of the P polarized light and the reflection of the S polarized light on the polarization splitting face of the polarization splitting element $16_{11}$ ($16_{21}$).

The polarizer $16_{12}$ has a transmission axis which corresponds to a polarization direction of the S polarized light.

The polarization splitting device $16_1$ is on the −X side of the fθ lens $15_1$, and arranged on an optical path of light beams (here, the light beam LBa1 and the light beam LBb1) via the fθ lens $15_1$. And, the polarization splitting element $16_{11}$ is arranged to reflect the S polarized light in the −Z direction. Here, as illustrated in FIG. 14, since the light beam LBa1 via the fθ lens $15_1$ is the P polarized light, the light beam LBa1 is transmitted through the polarization splitting element $16_{11}$, and since the light beam LBb1 via the fθ lens $15_1$ is the S polarized light, the light beam LBb1 is reflected in the −Z direction by the polarization splitting element $16_{11}$. The S polarized light is transmitted through the polarizer $16_{12}$ where its transmission axis corresponds to the polarization direction of the S polarized light. FIG. 14 is a schematic diagram illustrating an example of polarization splitting in the polarization splitting device $16_1$ and a function of the reflecting mirror $17_1$.

On the optical path of the light beam transmitted through the polarization splitting element $16_{11}$, a polarizer $16_{13}$ where its transmission axis corresponds to the polarization direction of the P polarized light is added and arranged, and therefore it is possible to improve removal performance of ghost light. A polarization splitting device in this case is illustrated in FIG. 15. FIG. 15 is a schematic diagram illustrating another example of polarization splitting in the polarization splitting device $16_1$ ($16_2$) and the function of the reflecting mirror $17_1$. In this specification, a light beam in an unwanted polarization state where each component of the S polarized light and the P polarized light that has not been split by the polarization splitting device $16_1$ ($16_2$) is contained is referred to as "ghost light".

As illustrated in FIG. 3, the light beam (here, the light beam LBa1) transmitted through the polarization splitting device $16_1$ illuminates a surface of the photosensitive drum 2030a via the bending-back mirror 18a and the anamorphic lens 19a, and a light spot is formed. The light spot moves in a longitudinal direction of the photosensitive drum 2030a (rotation axis direction of the photosensitive drum 2030a: Y direction) with a rotation of the polygon mirror 14. That is, the surface of the photosensitive drum 2030a is scanned. A moving direction of the light spot at this time is "a main scanning direction" of the photosensitive drum 2030a, and a rotating direction of the photosensitive drum 2030a is "a sub-scanning direction" of the photosensitive drum 2030a. Thus, the fθ lens $15_1$, the polarization splitting device $16_1$, the bending-back mirror 18a, and the anamorphic lens 19a constitute a scanning optical system of the K station.

On the other hand, after the light beam (here, the light beam LBb1) reflected in the −Z direction by the polarization splitting device $16_1$ is reflected in the −X direction by the reflecting mirror $17_1$, it illuminates a surface of the photosensitive drum 2030b via the bending-back mirror $18b_1$, the bending-back mirror $18b_2$, and the anamorphic lens 19b, and a light spot is formed. The light spot moves in a longitudinal direction of the photosensitive drum 2030b (rotation axis direction of the photosensitive drum 2030b: Y direction) with a rotation of the polygon mirror 14. That is, the surface of the photosensitive drum 2030b is scanned. A moving direction of the light spot at this time is "a main scanning direction" of the photosensitive drum 2030b, and a rotating direction of the photosensitive drum 2030b is "a sub-scanning direction" of the photosensitive drum 2030b. Thus, the fθ lens $15_1$, the polarization splitting device $16_1$, the bending-back mirror $18b_1$, the bending-back mirror $18b_2$, and the anamorphic lens 19b constitute a scanning optical system of the C station.

That is, the fθ lens $15_1$ and the polarization splitting device $16_1$ are shared by two image forming stations (K and C stations).

Here, specifications of the scanning optical system of the K station in the present embodiment will be explained with specific examples.

The deflector 14 is a four-face polygon mirror. One of the two light beams incident on the deflector 14 polarizes in a direction parallel to the rotation axis of the deflector 14, and the other one of the two light beams incident on the deflector 14 becomes polarized light perpendicular to the rotation axis of the deflector 14. The two light beams reflected by the deflector 14 are transmitted through the fθ lens $15_1$, the polarization splitting device $16_1$, and the anamorphic lens 19a.

Between the deflector 14 and the polarization splitting device $16_1$, no mirror is provided so as to prevent a change in the polarization direction due to metallic reflection.

In the following Table 1, a general description of the constitution of the scanning optical system is described. Regarding the curvature radius, a case where a center of curvature of each optical element is on a scanned face side (side where a light beam is incident) with respect to each optical element is positive, and a case where the center of curvature of each optical element is on a deflector side (side where a light beam is emitted) with respect to each optical element is negative.

TABLE 1

| COMPONENT NAME | REFERENCE POSITION | CURVATURE RADIUS [mm] | DISTANCE TO NEXT OPTICAL FACE [mm] | MATERIAL | SURFACE SHAPE |
| --- | --- | --- | --- | --- | --- |
| DEFLECTOR(14) | ROTATION CENTER | — | 36 | — | — |
| Fθ LENS ($15_1$, $15_2$) | INCIDENT FACE | −43.1 | 10 | GLASS 1 | ROTATION SYMMETRY SPHERICAL SURFACE (CONCAVE SURFACE) |
| | EMITTING FACE | −32.9 | 10 | GLASS 1 | ROTATION SYMMETRY SPHERICAL SURFACE (CONVEX SURFACE) |
| POLARIZATION SPLITTING ELEMENT ($16_{11}$, $16_{21}$) | INCIDENT FACE | ∞ | 3 | GLASS 2 | FLAT SURFACE |
| | EMITTING FACE | ∞ | 146 | GLASS 2 | FLAT SURFACE |
| ANAMORPHIC LENS (19a, 19b, 19c, 19d) | INCIDENT FACE | 879.5 | 3.5 | RESIN 1 | ANAMORPHIC SURFACE |
| | EMITTING FACE | 8762.1 | — | AIR | ANAMORPHIC SURFACE |

"GLASS 1" in Table 1 is an optical glass typified by BK7 and so on, and "RESIN 1" in Table 1 is an optical plastic with high transparency typified by ZEONEX or the like. In particular, it is preferable that materials be TOPAS, OPTOREZ, or the like, which are supplied as low birefringence materials.

Here, each of the polarization splitting elements $16_{11}$ and $16_{21}$ is formed by joining two longitudinal triangular prisms made of GLASS 2, and a dielectric multilayer is interposed between joint faces of each longitudinal triangular prism. "GLASS 2" is an optical glass suitably chosen based on production efficiency of the polarization splitting elements $16_{11}$ and $16_{21}$. The dielectric multilayer is designed to perform a suitable polarization splitting based on the wavelength of a light source.

The polarization splitting device $16_1$ can be arranged before the fθ lens $15_1$.

As illustrated in FIG. 2, the fθ lens $15_2$ is arranged on the +X side of the polygon mirror 14, and on an optical path of a light beam from the cylindrical lens $12_2$ deflected by the polygon mirror 14.

Figure 16:
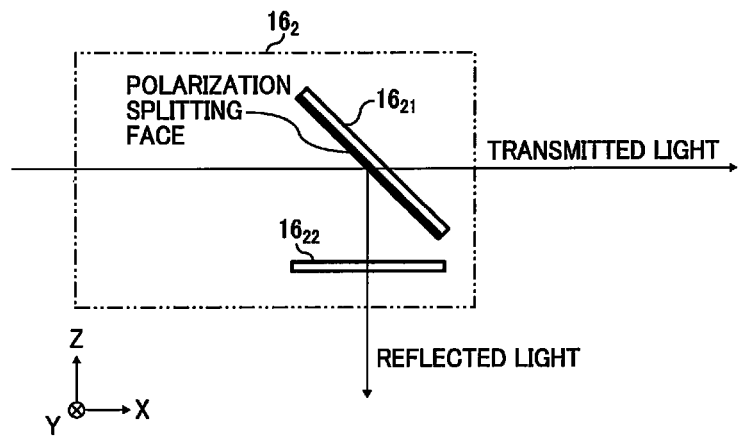
FIG. 16 is a schematic diagram illustrating an example of a constitution of a polarization splitting device $16_2$

FIG. 16 is a schematic diagram illustrating an example of a polarization splitting device $16_2$.

The polarization splitting device $16_2$ is the same as the polarization splitting device $16_1$, and, as illustrated in FIG. 16, includes a polarization splitting element $16_{21}$, and a polarizer $16_{22}$ which is arranged on the −Z side of the polarization splitting element $16_{21}$. A face of the polarization splitting element $16_{21}$ on which a wire grid is formed is a polarization splitting face. The polarization splitting element $16_{21}$ transmits the P polarized light and reflects the S polarized light. If a component of the S polarized light is contained in the incident light beam LBa2 on the polarization splitting element $16_{21}$ and a component of the P polarized light is contained in the incident light beam LBb2 on the polarization splitting element $16_{21}$, unintended reflection and transmission are performed and the splitting performance is deteriorated.

The polarizer $16_{22}$ has a transmission axis corresponds to a polarization direction of the S polarized light.

Figure 17:
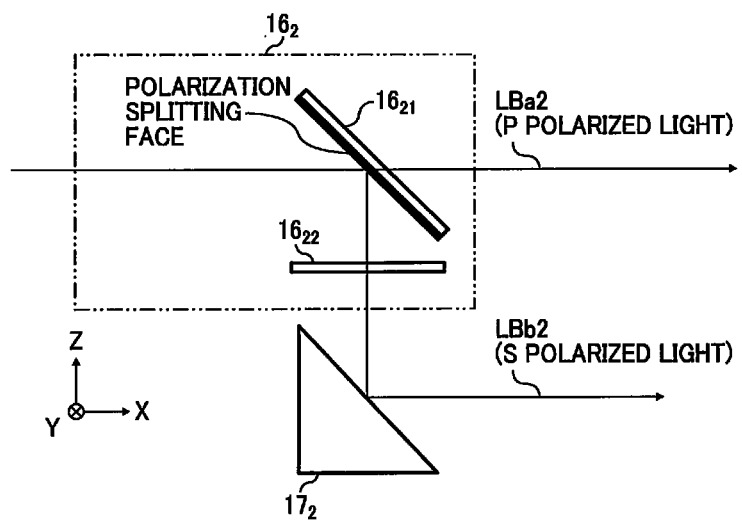
FIG. 17 is a schematic diagram illustrating an example of polarization splitting and a function of a reflecting mirror $17_2$ in the polarization splitting device $16_2$.

The polarization splitting device $16_2$ is on the +X side of the fθ lens $15_2$, and arranged on an optical path of light beams (here, the light beam LBa2 and the light beam LBb2) via the fθ lens $15_2$. And, the polarization splitting element $16_{21}$ is arranged to reflect the S polarized light in the −Z direction. Here, as illustrated in FIG. 17, since the light beam LBb2 via the fθ lens $15_2$ is the S polarized light, the light beam LBb2 is reflected in the −Z direction by the polarization splitting element $16_{21}$, and additionally, is transmitted through the polarizer $16_{22}$ where its transmission axis corresponds to the polarization direction of the S polarized light. Since the light beam LBa2 via the fθ lens $15_2$ is the P polarized light, the light beam LBa2 is transmitted through the polarization splitting element $16_{21}$. On the optical path of the light beam transmitted through the polarization splitting element $16_{21}$, a polarizer 16 where its transmission axis corresponds to the polarization direction of the P polarized light is added and arranged, and therefore it is possible to improve removal performance of the ghost light. Here, FIG. 17 is a schematic diagram illustrating an example of polarization splitting in the polarization splitting device $16_2$ and a function of the reflecting mirror $17_2$.

As illustrated in FIG. 3, after the light beam (here, the light beam LBb2) reflected in the −Z direction by the polarization splitting device $16_2$ is reflected in the +X direction by the reflecting mirror $17_2$, it illuminates a surface of the photosensitive drum 2030c via the bending-back mirror $18c_1$, the bending-back mirror $18c_2$, and the anamorphic lens 19c, and a light spot is formed. The light spot moves in a longitudinal direction of the photosensitive drum 2030c (rotation axis direction of the photosensitive drum 2030c: Y direction) with a rotation of the polygon mirror 14. That is, the surface of the photosensitive drum 2030c is scanned. A moving direction of the light spot at this time is "a main scanning direction" of the photosensitive drum 2030c, and a rotating direction of the photosensitive drum 2030c is "a sub-scanning direction" of the photosensitive drum 2030c.

Thus, the fθ lens $15_2$, the polarization splitting device $16_2$, the reflecting mirror $17_2$, the bending-back mirror $18c_1$, the bending-back mirror $18c_2$, and the anamorphic lens 19c constitute a scanning optical system of the M station.

On the other hand, the light beam (here, the light beam LBa2) transmitted through the polarization splitting device $16_2$ illuminates a surface of the photosensitive drum 2030d via the bending-back mirror 18d and the anamorphic lens 19d, and a light spot is formed. The light spot moves in a longitudinal direction of the photosensitive drum 2030d (rotation axis direction of the photosensitive drum 2030d: Y direction) with a rotation of the polygon mirror 14. That is, the surface of the photosensitive drum 2030d is scanned. A moving direction of the light spot at this time is "a main scanning direction" of the photosensitive drum 2030d, and a rotating direction of the photosensitive drum 2030d is "a sub-scanning direction" of the photosensitive drum 2030d. Thus, the fθ lens $15_2$, the polarization splitting device $16_2$, the bending-back mirror 18d, and the anamorphic lens 19d constitute a scanning optical system of the Y station.

That is, the fθ lens $15_2$ and the polarization splitting device $16_2$ are shared by two image forming stations (M and Y stations).

In the present embodiment, the fθ lens 15 is provided between the polygon mirror 14 and the polarization splitting device 16 (polarization splitting element). And since an optical path of the P polarized light and an optical path of the S polarized light are approximately overlapped with respect to the Z-axis direction, it is possible to thin the fθ lens 15 in the Z direction.

The scanning control device (not illustrated) has a light source control device corresponding to each of the light sources 10a and 10b. And the light source control device corresponding to each of the light sources 10a and 10b is mounted on a circuit board of the light source unit LU1.

As is clear from the above explanation, in the light scanning device 2010 according to the present embodiment, the scanning optical system includes the fθ lens ($15_1$, $15_2$), the polarization splitting device ($16_1$, $16_2$), the reflecting mirror ($17_1$, $17_2$), the bending-back mirror (18a, $18b_1$, $18b_2$, $18c_1$, $18c_2$, 18d) and the anamorphic lens (19a, 19b, 19c, 19d).

In the present embodiment, since the fθ lens ($15_1$, $15_2$) and the polarization splitting device ($16_1$, $16_2$) are shared by the two image forming stations (Y and M stations/C and K stations), it is possible to achieve further miniaturization.

Figure 18:
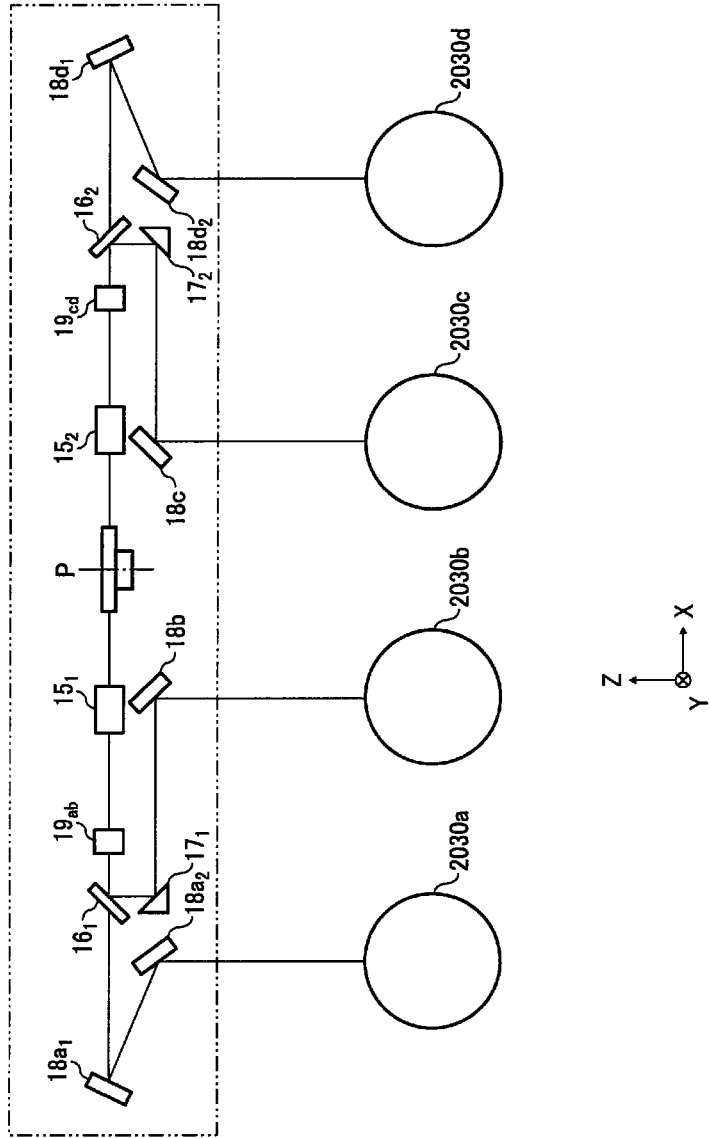
FIG. 18 is a schematic front diagram illustrating a variation of a constitution of the light scanning device according to the first embodiment of the present invention.

FIG. 18 is a schematic front view illustrating a variation of a constitution of the light scanning device according to the first embodiment of the present invention.

As illustrated in FIG. 18, as an embodiment in order to achieve further miniaturization, there is a constitution such that the anamorphic lens (19ab, 19cd) is arranged behind the fθ lens ($15_1$, $15_2$), and the polarization splitting device 16 (polarization splitting element) is arranged behind the anamorphic lens (19ab, 19cd). In this case, the anamorphic lens (19ab, 19cd) is shared by the two image forming stations (Y and M stations/C and K stations), and therefore it is possible for the light scanning device to be made thinner.

In the present embodiment, since the beam splitter 30 transmits and reflects incident light with a phase state of which being maintained, it is only necessary to allow a polarization state of the incident light to be in a P polarized state (P polarized light) and an S polarized state (S polarized light) by the optical system before the beam splitter 30, and therefore it is possible to arrange two light sources on the same circuit board by arranging the light sources 10a and 10b as illustrated in FIG. 5.

According to the color printer 2000 of the present embodiment, because of the inclusion of the light scanning device 2010, it is possible to achieve a miniaturization and form a high-quality image without an increase in cost.

Second Embodiment

Figure 19:
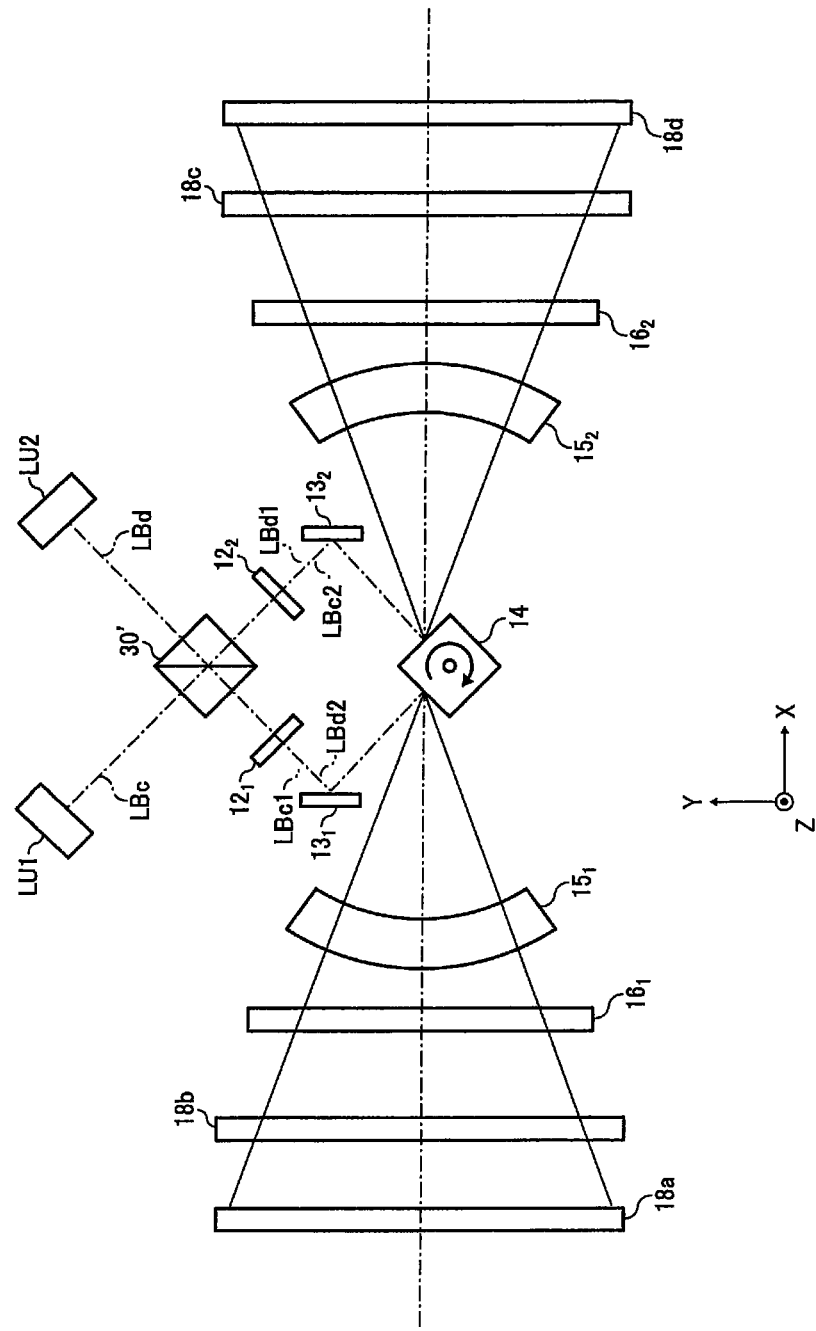
FIG. 19 is a schematic top diagram illustrating a constitution of a light scanning device according to a second embodiment of the present invention.

FIG. 19 is a schematic top view illustrating a constitution of a light scanning device according to a second embodiment of the present invention. A schematic front view of a constitution of the light scanning device according to the second embodiment of the present invention is the same as the schematic front view (FIG. 3) of the constitution of the light scanning device according to the first embodiment.

The light scanning device 2010, as illustrated in FIG. 19 and FIG. 3, has two light source units (LU1, LU2), two cylindrical lenses ($12_1$, $12_2$), a polygon mirror 14, two fθ lenses ($15_1$, $15_2$), two polarization splitting devices ($16_1$, $16_2$), two reflecting mirrors ($17_1$, $17_2$), a plurality of bending-back mirrors (18a, $18b_1$, $18b_2$, $18c_1$, $18c_2$, 18d), four anamorphic lenses (19a, 19b, 19c, 19d), and a scanning control device (not illustrated).

Figure 20:
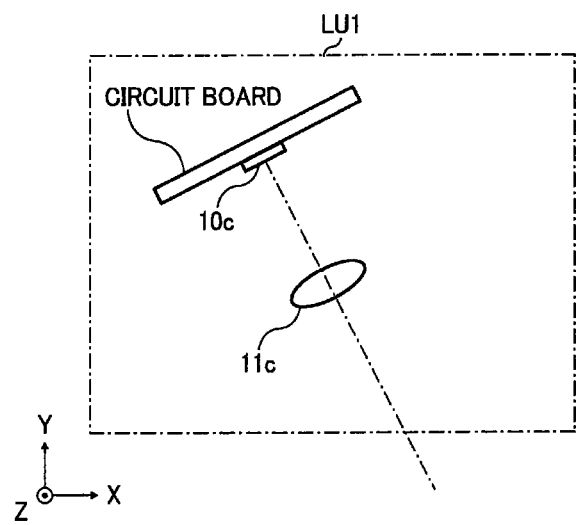
FIG. 20 is a schematic diagram illustrating a constitution of a light source unit LU1 of the light scanning device according to the second embodiment of the present invention.
Figure 21:
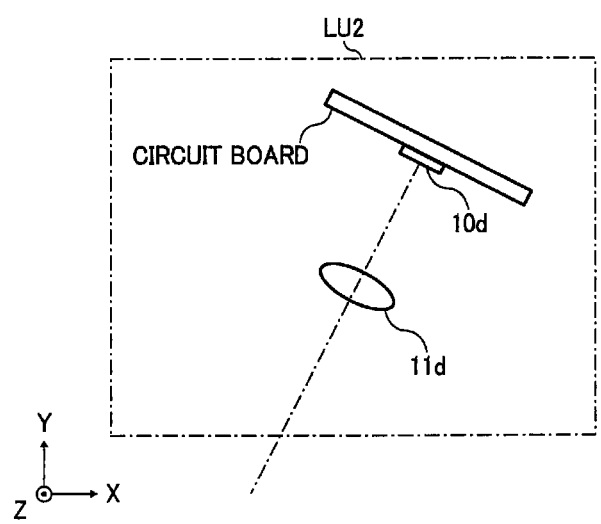
FIG. 21 is a schematic diagram illustrating a constitution of a light source unit LU2 of the light scanning device according to the second embodiment of the present invention.

FIG. 20 is a schematic diagram illustrating a constitution of a light source unit LU1 of the light scanning device according to the second embodiment of the present invention. FIG. 21 a schematic diagram illustrating a constitution of a light source unit LU2 of the light scanning device according to the second embodiment of the present invention.

The light source unit LU1, as illustrated in FIG. 20 as an example, has a light source (10c) and a collimating lens (11c).

The light source unit LU2, as illustrated in FIG. 21 as an example, has a light source (10d) and a collimating lens (11d).

Figure 22:
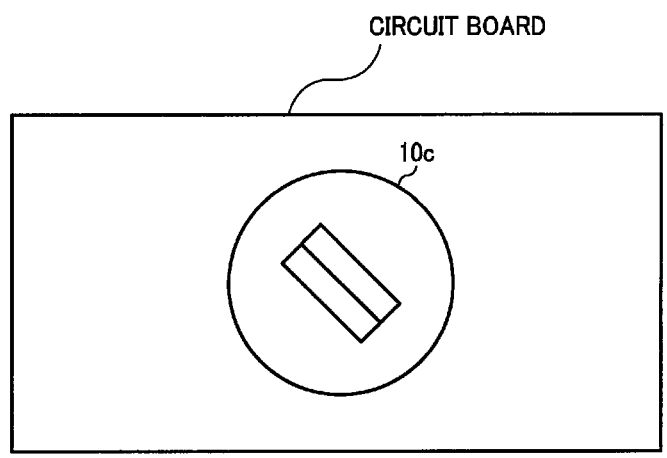
FIG. 22 is a schematic diagram illustrating an example of an arrangement of a light source $10c$ illustrated in FIG. 20.
Figure 23:
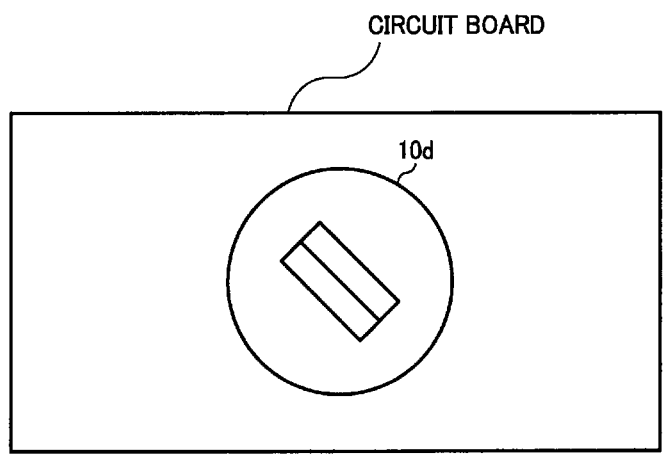
FIG. 23 is a schematic diagram illustrating an example of an arrangement of a light source $10d$ illustrated in FIG. 21.

The light source 10c and the light source 10d are equal light sources. The light source 10c and the light source 10d are arranged on a circuit board such that a polarization direction of emitted light therefrom is tilted at 45 degrees. That is, as illustrated in FIGS. 22 and 23, each light source is mounted on the board in a state of rotating by 45 degrees. Here, each of the light source 10c and the light source 10d emits linear polarized light (a first light beam and a second light beam, respectively) which is tilted at 45 degrees to the polarization direction of the P polarized light. FIG. 22 is a schematic diagram illustrating an example of an arrangement of the light source 10c illustrated in FIG. 20. FIG. 23 is a schematic diagram illustrating an example of an arrangement of the light source 10d illustrated in FIG. 21.

The collimating lens 11c is arranged on an optical path of a light beam (LBc) from the light source 10, and allows the light beam LBc to be approximately parallel light.

The collimating lens 11d is arranged on an optical path of a light beam (LBd) from the light source 10d, and allow the light beam LBd to be approximately parallel light.

As illustrated in FIG. 19, the approximately parallel light beam LBc is split into reflected light LBc1 and transmitted light LBc2 by a polarization beam splitter 30 as a light beam splitter.

The approximately parallel light beam LBd is split into reflected light LBd1 and transmitted light LBd2 by a polarization beam splitter 30' as a light beam splitter.

The cylindrical lens $12_1$ focuses the light beam LBc1 and the light beam LBd2 on approximately a deflecting reflection face of the polygon mirror 14 via an incident mirror $13_1$ with respect to the Z-axis direction.

The cylindrical lens $12_2$ focuses the light beam LBc2 and the light beam LBd1 on approximately a deflecting reflection face of the polygon mirror 14 via an incident mirror $13_2$ with respect to the Z-axis direction.

The light beam LBc1 and the light beam LBd1 are incident on the polygon mirror 14 with an appropriately π/2 angular difference to each other.

The light beam LBc2 and the light beam LBd2 are incident on the polygon mirror 14 with an appropriately π/2 angular difference to each other.

The light beams LBc1, LBc2, LBd1, and LBd2 split by the beam splitter 30' are incident on the polygon mirror 14 by the cylindrical lens $12_1$, the cylindrical lens $12_2$, the incident mirror $13_1$, and the incident mirror $13_2$ constituting an incident optical system such that the light beam LBc1 and the light beam LBd1 have the approximately λ/2 angular difference to each other, and the light beam LBc2 and the light beam LBd2 have the approximately λ/2 angular difference to each other.

Figure 24:
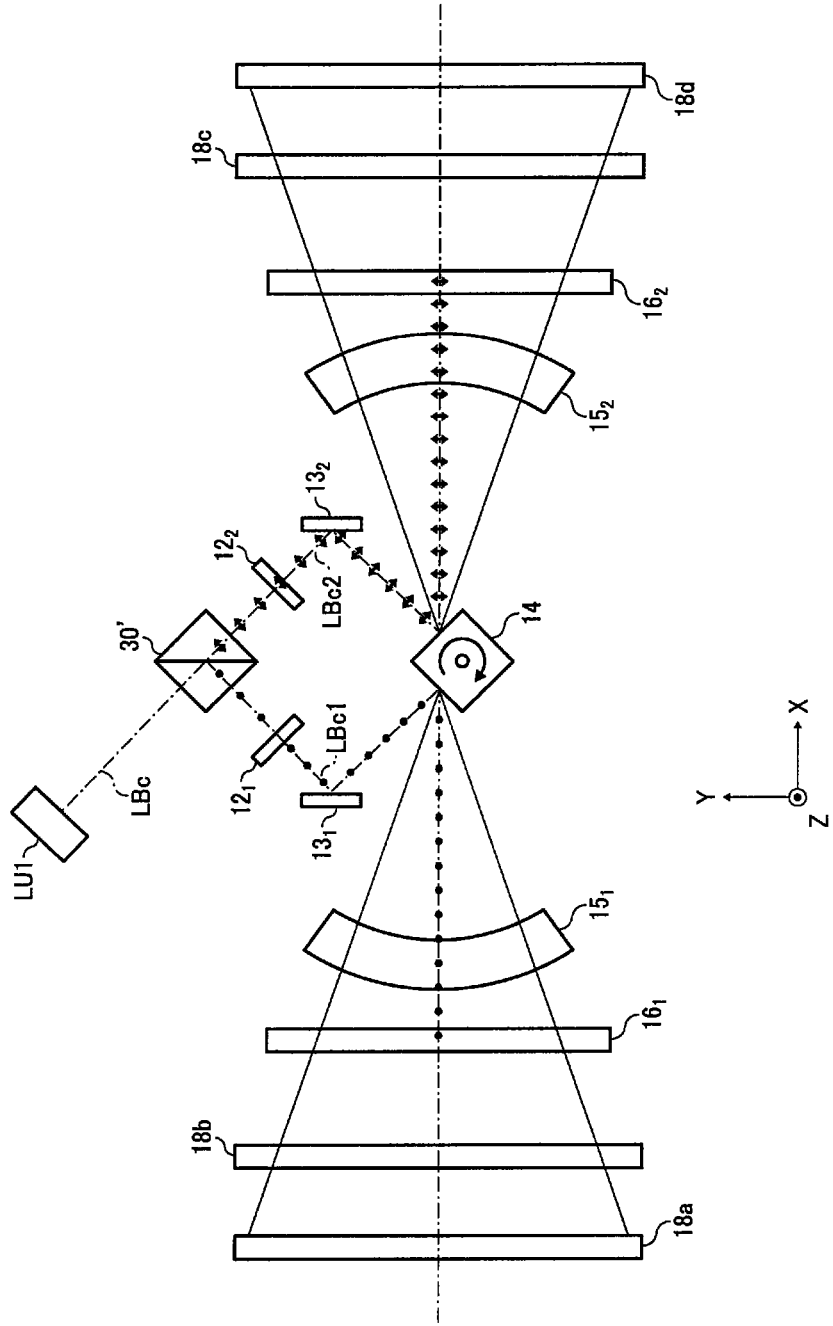
FIG. 24 is a diagram illustrating a polarization state of only a light beam from the light source unit LU1 of the light scanning device according to the second embodiment of the present invention.
Figure 25:
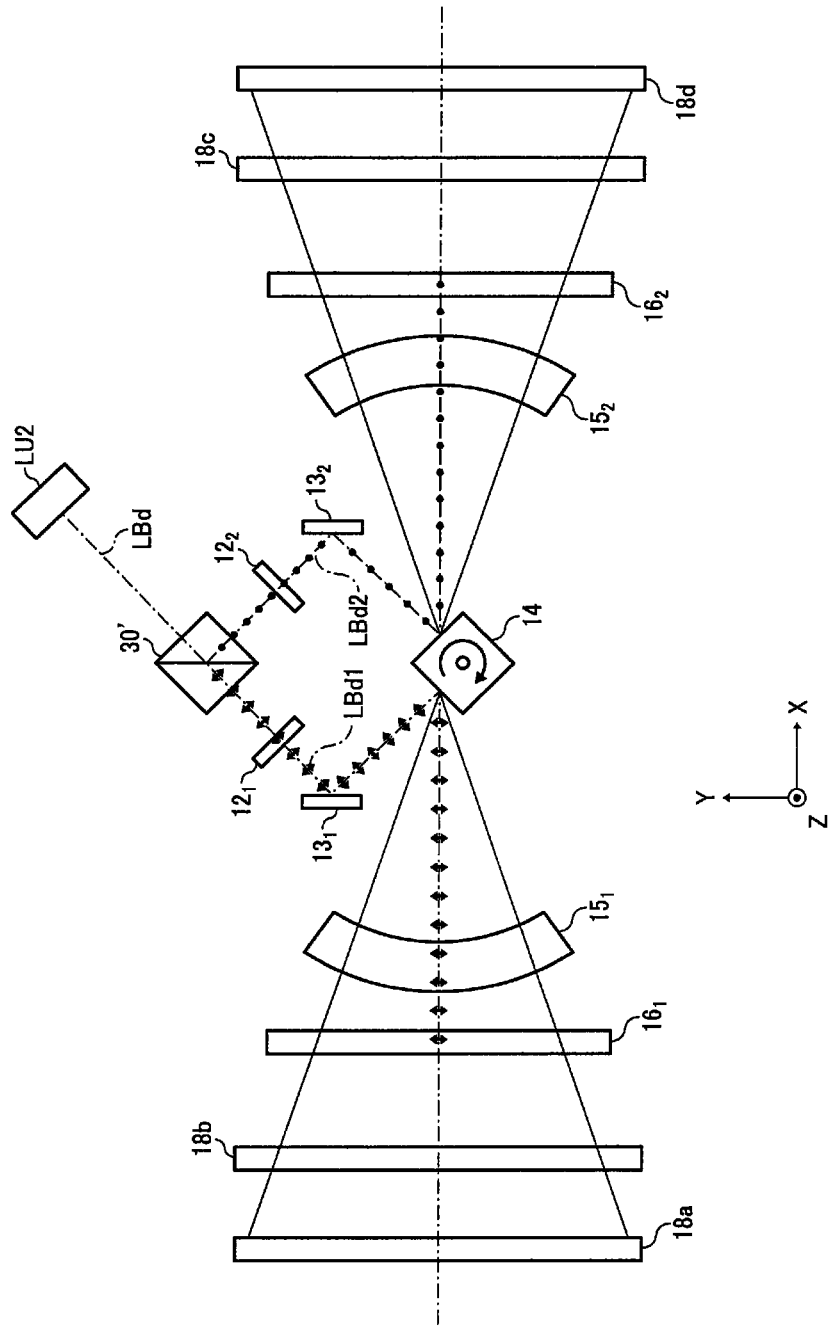
FIG. 25 is a diagram illustrating a polarization state of only a light beam from the light source unit LU2 of the light scanning device according to the second embodiment of the present invention.
Figure 26:
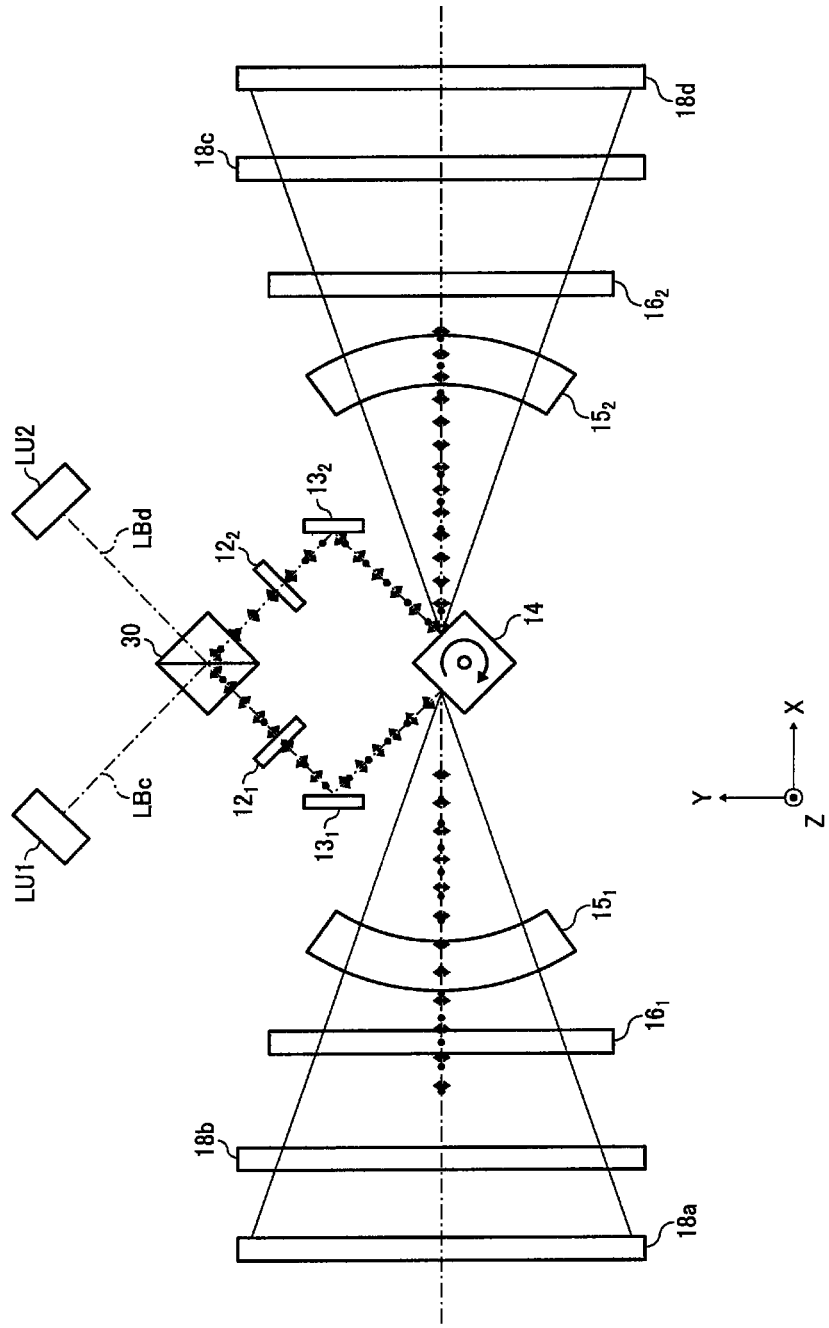
FIG. 26 is a diagram illustrating a polarization state of light beams from the light source unit LU1 and the light source unit LU2 of the light scanning device according to the second embodiment of the present invention.

FIG. 24 is a diagram illustrating a polarization state of a light beam from the light source unit LU1 of the light scanning device according to the second embodiment of the present invention. FIG. 25 is a diagram illustrating a polarization state of a light beam from the light source unit LU2 of the light scanning device according to the second embodiment of the present invention. FIG. 26 is a diagram illustrating a polarization state of light beams from the light source units LU1 and LU2 of the light scanning device according to the second embodiment of the present invention.

Here, the polarization state of each of the light beams will be explained by use of FIGS. 24, 25, and 26.

In FIG. 24, the polarization state of only the light beam from the light source unit LU1 is illustrated, and in FIG. 25, the polarization state of only the light beam from the light source unit LU2 is illustrated, and in FIG. 26, a polarization state where the polarization state illustrated in FIG. 24 and the polarization state illustrated in FIG. 25 are combined is illustrated.

The beam splitter 30' is a polarization beam splitter, and transmits a component of the P polarized light, and reflects a component of the S polarized light.

That is, as illustrated in FIG. 24, the light beam LBc is split by the polarization beam splitter 30' into a light beam LBc1 which has the component of the S polarized light and a light beam LBc2 which has the component of the P polarized light. As described above, since the light beam LBc is the linear polarized light which is tilted at 45 degrees, the ratio of the component of the P polarized light to the component of the S polarized light is equal. Therefore, the ratio of the light amount of the light beam LBc1 to the light beam LBc2 is 1:1.

The light beam LBc1 reflected by the polarization beam splitter 30' travelling toward the −X side via the cylindrical lens $12_1$ and the incident mirror $13_1$ is scanned by the deflector 14, and travels toward the −X side. The light beam LBc 1 travelling toward the −X side is the S polarized light, and expressed by a black circle in FIG. 24.

And, the light beam LBc2 transmitted through the beam splitter 30' travelling toward the +X side via the cylindrical lens $12_2$ and the incident mirror $13_2$ is scanned by the deflector 14, and travels toward the +X side. The light beam LBc2 travelling toward the +X side is the P polarized light, and expressed by a double-headed arrow in FIG. 24.

On the other hand, as illustrated in FIG. 25, the light beam LBd is split by the polarization beam splitter 30' into a light beam LBd1 which has the component of the P polarized light and a light beam LBd2 which has the component of the S polarized light. As described above, since the light beam LBd is the linear polarized light which is tilted at 45 degrees, the ratio of the component of the P polarized light to the component of the S polarized light is equal. Therefore, the ratio of the light amount of the light beam LBd1 to the light beam LBd2 is 1:1.

The light beam LBd1 transmitted through the polarization beam splitter 30' travelling toward the −X side via the cylindrical lens $12_1$ and the incident mirror $13_1$ is scanned by the deflector 14, and travels toward the −X side. The light beam LBd1 travelling toward the −X side is the P polarized light, and expressed by a double-headed arrow in FIG. 25.

And, the light beam LBd2 reflected by the beam splitter 30' travelling toward the +X side via the cylindrical lens $12_2$ and the incident mirror $13_2$ is scanned by the deflector 14, and travels toward the +X side. The light beam LBd2 travelling toward the +X side is the S polarized light, and expressed by a black circle in FIG. 25.

In the present embodiment, since the incident light is split into the P polarized light and the S polarized light by the polarization beam splitter 30', there is an advantage in that the splitting performance of the polarization splitting devices $16_1$ and $16_2$ is not deteriorated.

FIG. 26 is an overlapped version of FIG. 24 and FIG. 25. As illustrated in FIG. 26, in an optical system behind the polygon mirror 14, as in the first embodiment (see FIG. 9), the P polarized light and the S polarized light are overlapped and scanned. That is, as in the first embodiment, it is possible to scan a plurality of scanned faces by the scanning optical system. In other words, the two light beams are split into four light beams by the polarization splitting devices $16_1$ and $16_2$, and the K station, the C station, the M station, and the Y station are scanned.

Third Embodiment

The present embodiment is an embodiment in the case where a multi-beam light source having equal to or more than two channels is used as one light source.

A schematic top view illustrating a constitution of a light scanning device according to the third embodiment of the present invention is the same as the schematic top view (FIG. 2) illustrating the constitution of the light scanning device according to the first embodiment of the present invention.

A schematic front view illustrating the constitution of the light scanning device according to the third embodiment of the present invention is the same as the schematic front view (FIG. 3) illustrating the constitution of the light scanning device according to the first embodiment of the present invention.

That is, the light scanning device 2010, as in the first embodiment, is the light scanning device illustrated in FIGS. 2 and 3.

However, in the case of using the multi-beam light source, it is necessary to adjust an interval in the sub-scanning direction between light beams of the same multi-beam light source, and adjust an interval in the sub-scanning direction between light beams scanning at each station to be a predetermined value.

Figure 27:
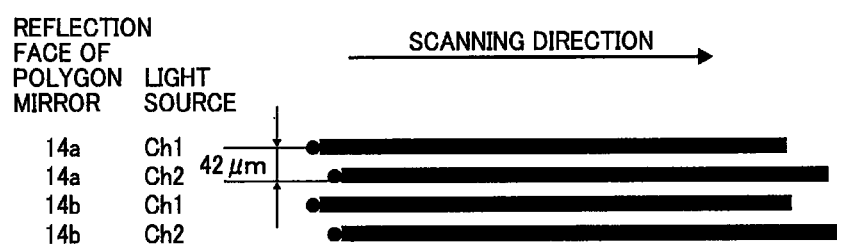
FIG. 27 is a diagram explaining a relationship between a light source ch and reflection faces $14a$ and $14b$ of a polygon mirror and an interval in a sub-scanning direction of a scanning line on a photosensitive body 2030.

FIG. 27 is a diagram explaining a relationship between a light source ch and reflection faces 14a and 14b of the polygon mirror 14 and an interval of scanning lines in the sub-scanning direction on the photosensitive body 2030.

As an example, in the case of writing in the sub-scanning direction at a writing density of 600 dpi, the interval of the scanning lines in the sub-scanning direction is adjusted to be 42 μm on the photosensitive drum 2030, and scanning is performed as illustrated in FIG. 27. The multi-beam light source in the present embodiment has two channels (light emitting points).

Here, in an example of light scanning on a scanned face illustrated in FIG. 27, light beams from light sources ch1 and ch2 that spot-illuminate the reflection face 14a of the polygon mirror 14 perform light scanning on the scanned face with a rotation of the polygon mirror 14, and the light scanning of two upper scanning lines of the scanning lines in FIG. 27 is executed. And then, the light beams from the light sources ch1 and ch2 spot-illuminate the reflection face 14b of the polygon mirror 14 with the rotation of the polygon mirror 14, and the light scanning of two lower scanning lines of the scanning lines in FIG. 27 is executed.

Figure 28:
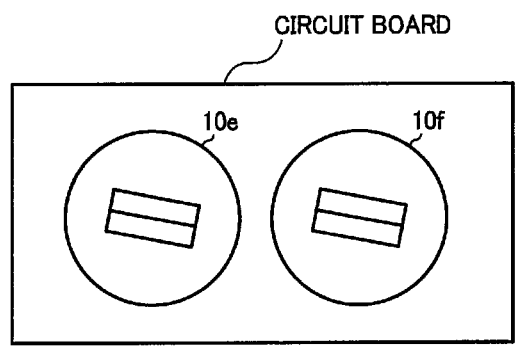
FIG. 28 is a schematic diagram illustrating an example of an arrangement of two light sources $10e$ and $10f$ of a light source unit LU1 of a light scanning device according to a third embodiment of the present invention.

Since the light emitting points of the multi-beam light source are aligned at an equal interval, it is general to rotate and use light sources 10e and 10f as illustrated in FIG. 28 in order that the light beam ch1 and the light beam ch2 be spaced at a predetermined interval in the sub-scanning direction. FIG. 28 is a schematic diagram illustrating an example of an arrangement of the two light sources 10e and 10f of the light source unit LU1 of the light scanning device according to the third embodiment of the present invention.

Incidentally, since rotating the light sources 10e and 10f also makes polarization directions of the light beams from the light sources 10e and 10f rotate, it is not possible for the multi-beam light source alone to emit the P polarized light and the S polarized light unlike in the first embodiment.

Figure 29:
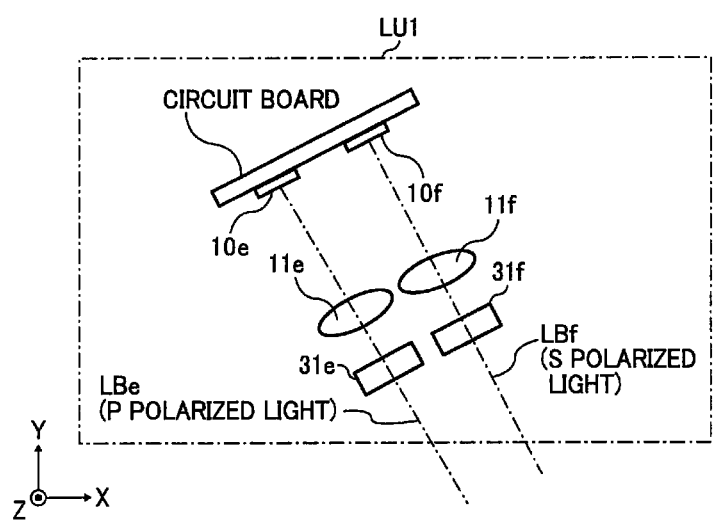
FIG. 29 is a schematic diagram illustrating a constitution of the light source unit LU1 according to the third embodiment of the present invention.

Therefore, as illustrated in FIG. 29, in the light source unit LU1 according to the present embodiment, a half-wave plate 31e changes a polarization direction of the light beam from the light source 10e to be the P polarized light. And likewise, a half-wave plate 31f changes a polarization direction of the light beam from the light source 10f to be the S polarized light. A light beam LBe travelling through the half-wave plate 31e becomes the P polarized light, and a light beam LBf travelling through the half-wave plate 31f becomes the S polarized light. Therefore, the two light beams emitted from the light source unit LU1 are the same as those of the first embodiment, and the K station, the C station, the M station, the Y station are scanned by the same optical system as that of the first embodiment except for the light source unit. FIG. 29 is a schematic diagram illustrating a constitution of the light source unit LU1 of the light scanning device according to the third embodiment of the present invention.

As a device that changes the polarization direction, a half-wave plate is taken as an example; however, an optical rotator such as a magneto-optical device and so on can be also used.

Fourth Embodiment

The present embodiment is an embodiment in the case where a multi-beam light source having equal to or more than two channels is used as one light source.

A schematic top view illustrating a constitution of a light scanning device according to the fourth embodiment of the present invention is the same as the schematic top view (FIG. 19) illustrating the constitution of the light scanning device according to the second embodiment of the present invention.

A schematic front view illustrating the constitution of the light scanning device according to the fourth embodiment of the present invention is the same as the schematic front view (FIG. 3) illustrating the constitution of the light scanning device according to the second embodiment of the present invention.

That is, the light scanning device 2010, as in the second embodiment, is the light scanning device illustrated in FIGS. 19 and 3.

Figure 30:
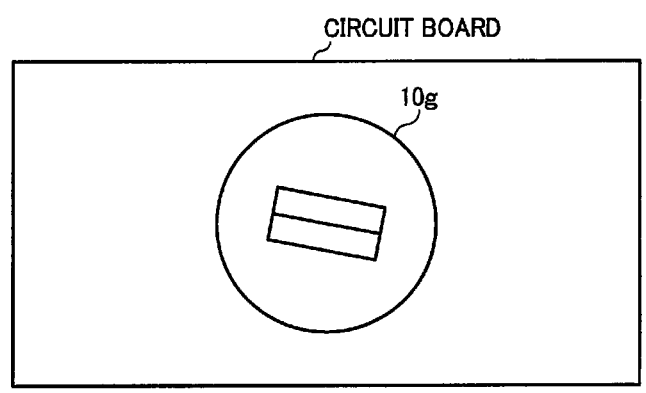
FIG. 30 is a schematic diagram illustrating an example of an arrangement of a light source $10g$ of a light source unit LU1 of a light scanning device according to a fourth embodiment of the present invention.
Figure 31:
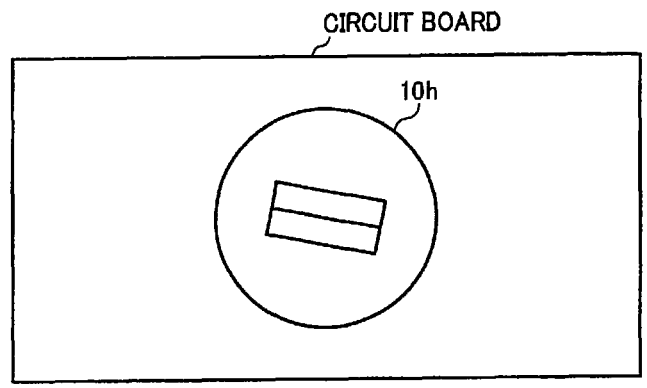
FIG. 31 is a schematic diagram illustrating an example of an arrangement of a light source $10h$ of a light source unit LU2 of the light scanning device according to the fourth embodiment of the present invention.

However, in the case of using the multi-beam light source, it is necessary to adjust an interval in the sub-scanning direction between light beams of the same multi-beam light source as in the third embodiment, and therefore each of a light source 10g of the light source unit LU1 illustrated in FIG. 30 and a light source 10h of the light source unit LU2 illustrated in FIG. 31 is rotated by the same angle as in the third embodiment illustrated in FIG. 28. That is, unlike the second embodiment, it is not possible for the multi-beam light source alone to emit linear polarized light which is tilted at 45 degrees to the polarization direction of the P polarized light.

FIG. 30 is a schematic diagram illustrating an example of an arrangement of the light source 10g of the light source unit LU1 of the light scanning device according to the fourth embodiment of the present invention. And FIG. 31 is a schematic diagram illustrating an example of an arrangement of the light source 10h of the light source unit LU2 of the light scanning device according to the fourth embodiment of the present invention.

Figure 32:
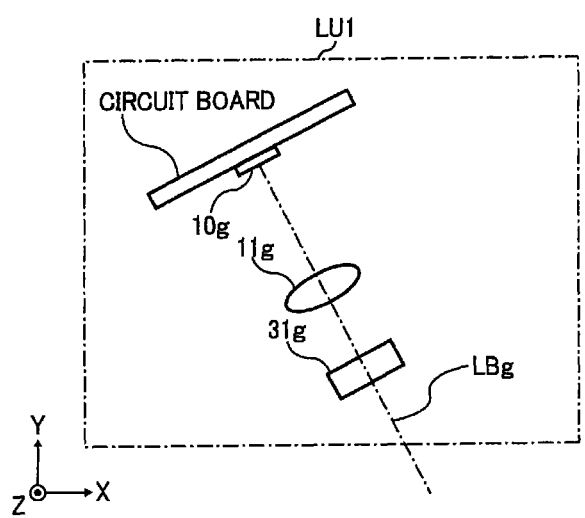
FIG. 32 is a schematic diagram illustrating a constitution of the light source unit LU1 according to the fourth embodiment of the present invention.
Figure 33:
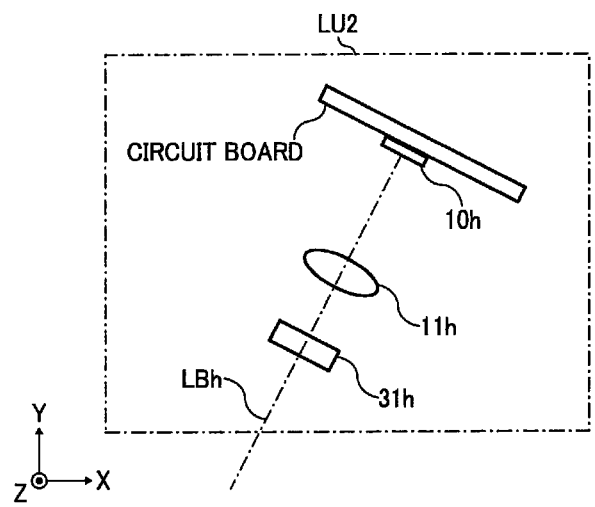
FIG. 33 is a schematic diagram illustrating a constitution of the light source unit LU2 according to the fourth embodiment of the present invention.

Therefore, in the light source unit LU1 of the present embodiment, as illustrated in FIG. 32, a half-wave plate 31g changes a polarization direction of a light beam from the light source 10g and converts the light beam to a light beam which is tilted at 45 degrees to the polarization direction of the P polarized light. And likewise, in the light source unit LU2, as illustrated in FIG. 33, a half-wave plate 31h changes a polarization direction of the light beam from the light source 10h and converts the light beam to a light beam which is tilted at 45 degrees to the polarization direction of the P polarized light.

FIG. 32 is a schematic diagram illustrating an example of a constitution of the light source unit LU1 of the light scanning device according to the fourth embodiment of the present invention. And FIG. 33 is a schematic diagram illustrating an example of a constitution of the light source unit LU2 of the light scanning device according to the fourth embodiment of the present invention.

After being converted by the half-wave plate 31g or the half-wave plate 31h, the light beams emitted from the light source units LU1 and LU2 are the same as those of the second embodiment, and the K station, the C station, the M station, the Y station are scanned by the same optical system as that of the second embodiment except for the light source unit.

As a device that changes the polarization direction, a half-wave plate is taken as an example; however, an optical rotator such as a magneto-optical device and so on can also be used.

Fifth Embodiment

Figure 34:
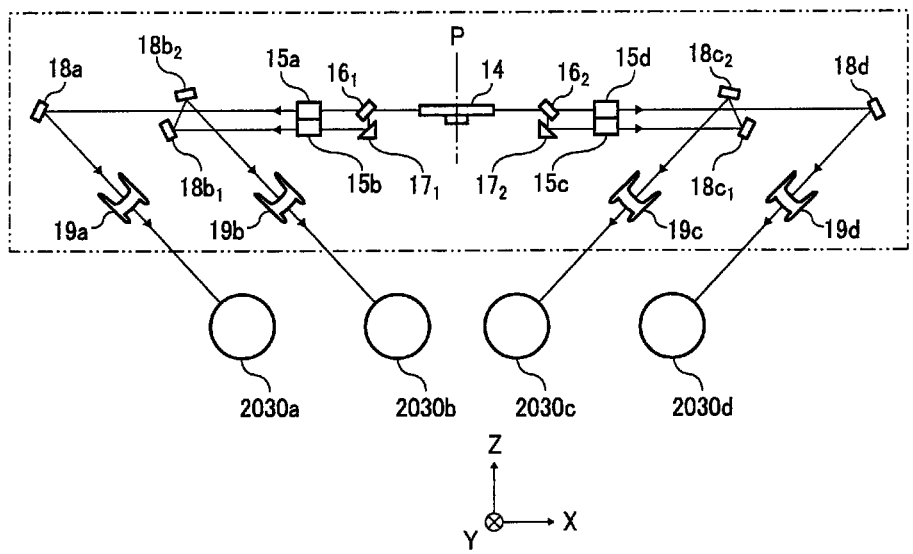
FIG. 34 is a schematic diagram illustrating a constitution of a light scanning device according to a fifth embodiment of the present invention.

FIG. 34 is a schematic front diagram of a constitution of a light scanning device according to the fifth embodiment of the present invention.

In the constitutions of the first to fourth embodiments, the fθ lens is arranged before the polarization splitting device 16; however, as illustrated in FIG. 34 as an example, in the fifth embodiment, the fθ lens is arranged behind the polarization splitting device 16.

In the present embodiment, each light beam (travelling toward two directions of the valid scanning areas A and B) is further split into light beams in two directions, respectively by each of the polarization splitting devices $16_1$ and $16_2$, and therefore a total of four fθ lenses, an fθ lens 15a for a light beam LBa, an fθ lens 15b for a light beam LBb, an fθ lens 15c for a light beam LBc, and an fθ lens 15d for a light beam LBd are needed.

And as illustrated in FIG. 34, each optical distance between the polygon mirror and the fθ lens of the light beam LBa and the light beam LBb, or of the light beam LBc and the light beam LBd is different.

In addition, since each of the polarization splitting devices $16_1$ and $16_2$ and each of the reflecting mirrors $17_1$ and $17_2$ are arranged before the fθ lens, the polarization state of each of the light beam LBa and the light beam LBb, or of each of the light beam LBc and the light beam LBd is different; therefore a lens shape of each fθ lens is designed in consideration of a difference of a polarization state of the light beam, and differences of an optical distance, a focusing distance, and a scanning length.

As described above, an image forming apparatus according to the embodiments of the present invention is low in cost, small-sized, and suitable for forming a high-quality image.

According to the embodiments of the present invention, a light beam is split into (two) light beams by the beam splitter and each light beam having a λ/2 angular difference is incident on a different deflection face of the deflector, and light scanning is performed on two scanned faces by one light source, and therefore it is possible to decrease by half the number of light sources. Additionally, polarization splitting is performed by the polarization splitting device disposed behind the deflector in a space-saving manner, and therefore a light scanning device can be made small-sized.

According to the embodiments of the present invention, the (two) light beams split by the beam splitter are on the same plane, and therefore the (two) light beams are incident horizontally on the deflector, and it is possible to prevent the optical characteristic from deteriorating such as bending of the scanning line compared to the oblique incident optical system.

According to the embodiments of the present invention, it is possible to prevent the polarization state of the light beam which is incident on the polarization splitting device from deteriorating and improve the splitting performance.

According to the embodiments of the present invention, it is possible to determine the optical system before the beam splitter without considering that the polarized light is changed by the beam splitter, and make the degree of freedom of design higher. For example, the light sources can be put together in one unit.

According to the embodiments of the present invention, each of the first light beam and the second light beam can reliably be linear polarized light beams which are made orthogonal to each other by the beam splitter.

According to the embodiments of the present invention, it is possible to adjust the polarization state of the light beams incident on the beam splitter, even in the case where the polarization direction of the light beam emitted from the light source is tilted or rotated.

According to the embodiments of the present invention, the usage efficiency of the light beam is improved by using the wire grid, and the splitting performance of the light beam is improved.

According to the embodiments of the present invention, it is possible to provide a color image forming apparatus which is low in cost and small-sized by providing the light scanning device in which the number of light sources is decreased by half, and which is small-sized.

According to the embodiments of the present invention, it is possible to provide a light scanning device that can be small-sized, and form a high-quality image without increasing the cost, and provide an image forming apparatus having the light scanning device.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A light scanning device which scans a plurality of scanned faces by a light beam, comprising:
   a light source unit which emits a plurality of light beams including a first light beam and a second light beam having different polarization directions to each other;
   a beam splitter which splits each of the first light beam and the second light beam emitted from the light source unit into, respectively, split first light beams that are split from the first light beam and split second light beams that are split from the second light beam;
   an incident optical system which allows each of the split first light beams to be incident with an angular difference to each other, and allows each of the split second light beams to be incident with an angular difference to each other;
   a deflector which respectively deflects each of the split first light beams and each of the split second light beams entered from the incident optical system; and
   a scanning optical system, including a polarization splitting device for splitting a plurality of the light beams deflected by the deflector based on a difference in a polarization direction, which individually focuses each of the plurality of the light beams split by the polarization splitting device on a corresponding scanned face, wherein
   when the split first light beams and the split second light beams are incident on a plane of the deflector that is vertical to a rotational axis of the deflector, respectively, each of the split first light beams is incident with an angular difference to each other, and each of the split second light beams is incident with an angular difference to each other.

2. The light scanning device according to claim 1, wherein the angular difference between the split first light beams is approximately $\pi/2$, and the angular difference between the split second light beams is approximately $\pi/2$.

3. The light scanning device according to claim 1, wherein all of the light beams emitted from the beam splitter are on the same plane.

4. The light scanning device according to claim 3, wherein a polarization direction of the first light beam or the second light beam split by the beam splitter is horizontal or vertical to a plane including the first light beam and the second light beam split by the beam splitter.

5. The light scanning device according to claim 1, wherein the beam splitter splits a light beam without changing the polarization state at the time of incidence.

6. The light scanning device according to claim 1, wherein the beam splitter is a polarization beam splitter.

7. The light scanning device according to claim 5, wherein a half-wave plate, or an optical rotator is provided on a light path before the beam splitter.

8. The light scanning device according to claim 1, wherein the polarization splitting device includes a polarization splitting element on which a wire grid is formed.

9. A color image forming apparatus comprising the light scanning device according to claim 1.

10. A light scanning device which scans a plurality of scanned faces by a light beam, comprising:
    light source means for emitting a plurality of light beams including a first light beam and a second light beam having different polarization directions to each other;
    beam splitter means for splitting each of the first light beam and the second light beam emitted from the light source means into, respectively, split first light beams that are split from the first light beam and split second light beams that are split from the second light beam;
    incident optical means for allowing each of split first light beams to be incident with an angular difference to each other, and for allowing each of split second light beams to be incident with an angular difference to each other;
    deflector means for respectively deflecting each of the split first light beams and each of the split second light beams entered from the incident optical means; and
    a scanning optical system including polarization splitting means for splitting a plurality of the light beams deflected by the deflector means based on a difference in a polarization direction, which individually focuses each of the plurality of the light beams split by the polarization splitting means on a corresponding scanned face, wherein
    when the split first light beams and the split second light beams are incident on a plane of the deflector means that is vertical to a rotational axis of the deflector means, respectively, each of the split first light beams is incident with an angular difference to each other, and each of the split second light beams is incident with an angular difference to each other.

* * * * *